(12) United States Patent
Zucker et al.

(10) Patent No.: US 12,475,986 B2
(45) Date of Patent: Nov. 18, 2025

(54) METHOD AND APPARATUS FOR ADMINISTERING A CANCER DRUG

(71) Applicant: Haniva LLC, Williamsville, NY (US)

(72) Inventors: Shoshanna N. Zucker, Williamsville, NY (US); Douglas P. DuFaux, Orchard Park, NY (US)

(73) Assignee: HANIVA LLC, Williamsville, NY (US)

( * ) Notice: Subject to any disclaimer, the term of this patent is extended or adjusted under 35 U.S.C. 154(b) by 835 days.

(21) Appl. No.: 17/755,818

(22) PCT Filed: Nov. 6, 2020

(86) PCT No.: PCT/US2020/059332
§ 371 (c)(1),
(2) Date: May 9, 2022

(87) PCT Pub. No.: WO2021/092324
PCT Pub. Date: May 14, 2021

(65) Prior Publication Data
US 2022/0399096 A1    Dec. 15, 2022

Related U.S. Application Data

(60) Provisional application No. 62/932,256, filed on Nov. 7, 2019.

(51) Int. Cl.
*G16H 20/17* (2018.01)
*A61B 17/34* (2006.01)
(Continued)

(52) U.S. Cl.
CPC ......... *G16H 20/17* (2018.01); *A61B 17/3403* (2013.01); *A61B 18/042* (2013.01);
(Continued)

(58) Field of Classification Search
None
See application file for complete search history.

(56) References Cited

U.S. PATENT DOCUMENTS 7,011,790 B2    3/2006    Ruan et al.
8,992,518 B2    3/2015    Fridman
(Continued)

OTHER PUBLICATIONS

Zhu, W. et al. Synergistic Effect of Cold Atmospheric Plasma and Drug Loaded Core-shell Nanoparticles on Inhibiting Breast Cancer Cell Growth. Sci. Rep. 6, 21974; doi: 10.1038/srep21974 (2016).
(Continued)

*Primary Examiner* — Manuel A Mendez
(74) *Attorney, Agent, or Firm* — Simpson & Simpson, PLLC

(57) ABSTRACT

An apparatus for administering a cancer drug, comprising an optical emitter operatively arranged to emit a visible point of light onto a tissue surface to be treated, a robotic arm, operatively arrange to move a drug-delivery device, in sequence, to each of a plurality of predetermined positions within the tissue to be treated, a tactile sensor operatively arranged at the distal end of the drug-delivery device to determine vertical height movement of the robotic arm for contact of the tissue surface to be treated, a reservoir arranged to store the cancer drug, a needle, operatively arranged to be moved to each of the specific positions within the tissue, and to deliver the drug at those positions, and, a torch head for generating non-thermal plasma in proximity to an end of the needle and the area to be treated.

15 Claims, 17 Drawing Sheets

(51) Int. Cl.
*A61B 18/04* (2006.01)
*A61B 34/32* (2016.01)
*A61B 34/20* (2016.01)
*A61B 90/00* (2016.01)

(52) U.S. Cl.
CPC ...... *A61B 34/32* (2016.02); *A61B 2034/2055* (2016.02); *A61B 2090/3945* (2016.02)

(56) References Cited

U.S. PATENT DOCUMENTS

| | | |
|---|---|---|
| 9,586,056 B2 | 3/2017 | Zucker |
| 2012/0089084 A1 | 4/2012 | O'Keeffe |
| 2012/0190981 A1* | 7/2012 | Harris ............... A61B 5/14 604/95.01 |
| 2012/0323325 A1 | 12/2012 | Fulton |
| 2014/0058252 A1 | 2/2014 | Varav |
| 2014/0188097 A1 | 7/2014 | Watson et al. |
| 2014/0378892 A1 | 12/2014 | Keidar |
| 2015/0111170 A1 | 4/2015 | Guy, Sr. |
| 2016/0001052 A1 | 1/2016 | Zucker |
| 2016/0331439 A1 | 11/2016 | Winkelman et al. |
| 2017/0326347 A1* | 11/2017 | Kalghatgi ............ A61N 1/44 |

OTHER PUBLICATIONS

Zucker, S. et al. Novel combination therapy for melanoma induces apoptosis via a gap junction positive feedback mechanism. Oncotarget, vol. 11, (No. 37) pp. 3443-3458, Sep. 15, 2020.

* cited by examiner

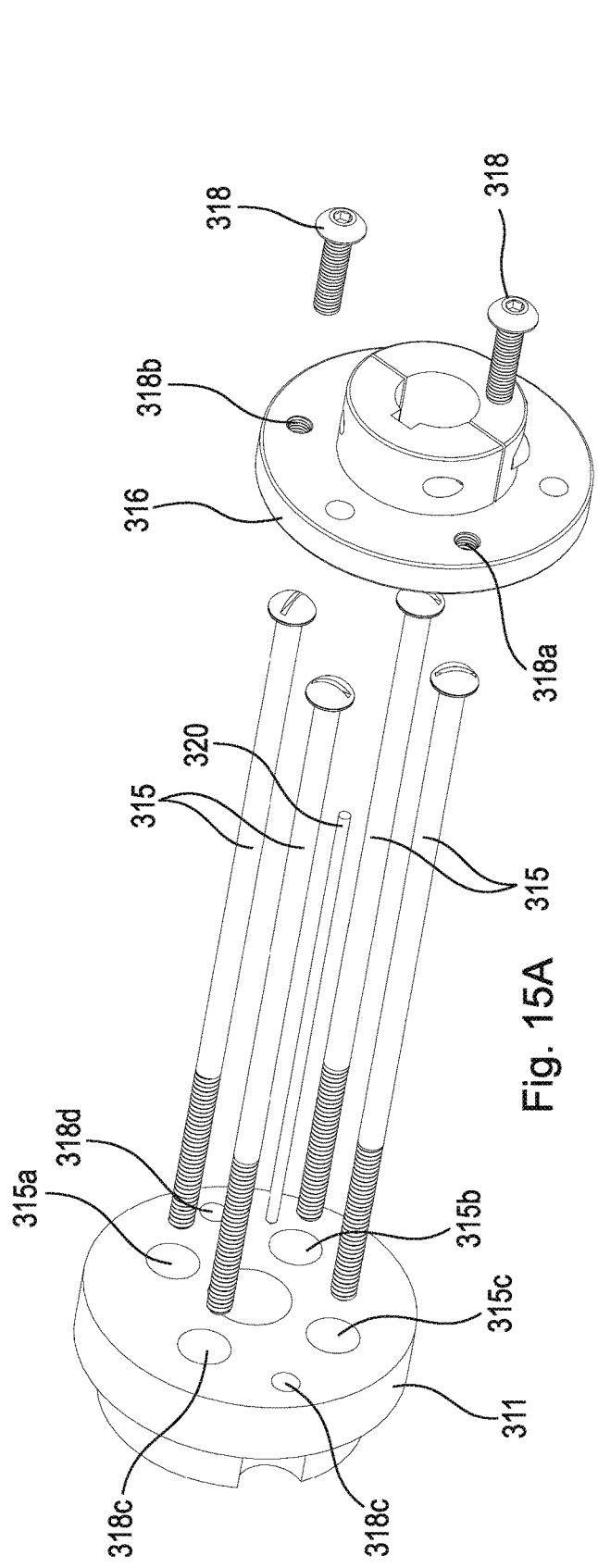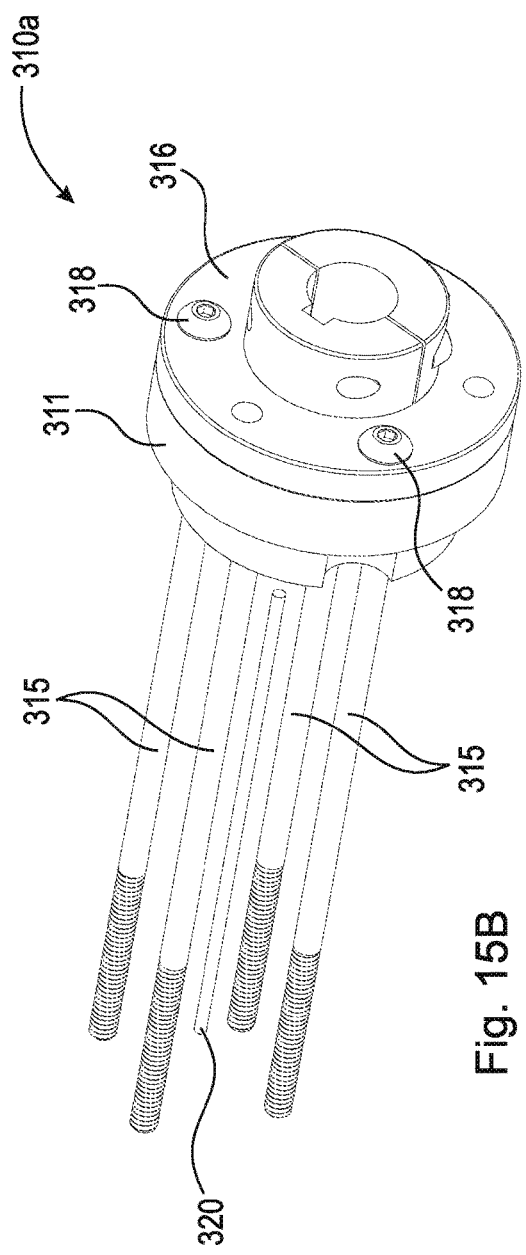

METHOD AND APPARATUS FOR ADMINISTERING A CANCER DRUG

CROSS-REFERENCE TO RELATED APPLICATIONS

This application claims priority under 35 U.S.C. § 119 (e) to U.S. Provisional Application No. 62/932,256, filed Nov. 7, 2019. This application also claims priority under 35 U.S.C. § 120 to PCT Application No.: PCT/US2020/059332, filed Nov. 6, 2020, which application is incorporated herein in its entirety.

FIELD OF THE INVENTION

The invention relates generally to an automated medical positioning device for administering a low temperature plasma and drug combination to a patient at a selected site of treatment on the patient.

REFERENCE TO COMPUTER PROGRAM LISTING APPENDIX

The present disclosure includes a computer program listing in an Appendix containing an ASCII text listing of the computer program as follows:
Alfie-Tech Code-For-Patent HANIVA Epson-Robot 102820 7 KB Modified: Oct. 28, 2020

BACKGROUND

Melanoma is a type of skin cancer that is the result of pigment-producing cells, known as melanocytes, mutating and becoming cancerous. A cancerous tumor or malignant tumor is a group of cancer cells that grow into nearby tissues and destroy that tissue. Malignant tumors can metastasize or spread to other areas of the body.

Melanocytes make melanin which gives skin, hair, and eyes their color. Skin is the largest organ of the human body; thus, it is essential to preventing outside substances and materials from entering the body. The skin protects the internal composition from outside temperature changes, and foreign bacteria. Skin also utilizes perspiration to regulate body temperature and remove waste products. In many cases, melanocytes can group together and form moles on the skin. These groupings can be of a different color, commonly brown or pink. In some cases these groupings can be raised to appear as a bump. The groupings are non-cancerous tumors, often referred to as benign tumors. In some cases, changes to melanocytes can cause melanoma skin cancer. An early indicator of this change can include a change in color, size, or shape of a benign tumor.

A malignant melanoma tumor progresses in severity through six stages. In the first stage (Stage 0 melanoma), the tumor is still confined to the upper layers of the skin (epidermis), known as in situ (e.g., in place). At this stage, the cancer has not spread to lymph nodes or metastasized to other sites. A malignant tumor up to 2 mm thick defines advancement to Stage I melanoma which is characterized by a localized tumor. At this stage, the tumor has not spread to lymph nodes or other sites. Stage I is further classified into two subclasses: Stage 1A and Stage 1B based on the thickness of the tumor and whether the tumor has ulcerated. Ulceration is a breakdown of the skin on top of the melanoma. Melanomas with ulceration are more serious because they have a greater risk of spreading, so they are staged higher than tumors without ulceration. The risk factors of Stage 0 and Stage I are considered to be low as localization of the tumor allows for more successful treatment.

Intermediate risk for repeat occurrences and spreading occurs at Stage II melanoma which is still characterized by a localized tumor. In Stage II, there is still no spread to lymph nodes or metastases to other areas. Ulceration is usually present in this stage and the depth of the tumor usually has reached the second layer of the skin (dermis). Stage II is further classified into three subclasses: Stage IIA, Stage IIB, and Stage IIC, based on the depth of the dermis that the tumor has penetrated. Advancement to Stage III melanoma occurs when the tumor has begun to spread to a lymph node and there is definite presence of ulceration. Stage III is further classified into four subclasses: Stage IIIA, IIIB, IIIC, and IIID, based on the number of lymph nodes the tumor has spread to. At Stage III, the risk level for the patient elevates to high due to the spreading of the tumor.

Stage IV melanoma indicates that the tumor has spread beyond the original site and regional lymph nodes to more distant areas of the body. The level of LDH (serum lactate dehydrogenase), an enzyme that indicates tissue damage, may be elevated. The most common sites of metastasis are to vital organs (e.g., lungs, abdominal organs, brain, and bone) and soft tissues (e.g., skin, subcutaneous tissues) as well as distant lymph nodes (i.e., lymph nodes beyond the primary tumor region). Stage IV is classified by three subclasses: M1a, M1b, and M1c. M1a is characterized by the spread to distant skin, the subcutaneous layer (skin layer below the dermis), or to distant lymph nodes, while LDH levels are normal. M1b is characterized by a metastasized tumor to the lung and LDH is normal. The most advanced Stage IV level, M1c is characterized by the tumor metastasizing to vital organs other than the lungs and LDH is normal, or there are any distant metastases with elevated LDH. Stage IV can further spread to the brain, or brain metastases. Brain metastases are one of the most common and difficult-to-treat complications of melanoma with risk factors that differ greatly according to cancer prognosis.

Skin cancer is currently the most common form of cancer across the United States. It is currently estimated by the American Cancer Society that over 100,350 new cases of melanoma will be diagnosed in the United States in 2020. The American Cancer Society also estimates that 6,850 deaths will be caused by melanoma in 2020.

Low temperature plasmas have emerged as a new development for therapeutics and its use with injection related administration of drugs. Cold-nonequilibrium plasmas have enormous potential in disease therapeutics and pharmacology as drug alternatives. Currently in the art, low temperature plasma applications include surface sterilization, bacterial decontamination, biofilm inactivation, antimicrobial treatment in preservation, wound healing and cancer treatment. The art of "plasma medicine" has emerged as a multi-disciplinary branch combining biomedical sciences and engineering. As of 2017 the state of the art of low temperature plasma had grown to nineteen separate subfields.

Nonequilibrium plasmas are operated at ambient atmospheric pressure and temperature. They are very effective sources for producing highly reactive neutral particles such as reactive oxygen and nitrogen species (RONS, i.e., atomic oxygen atomic nitrogen hydroxyl radical, superoxide, singlet delta oxygen, and nitrogen oxides), charged particles, UV-radiation, and electromagnetic fields. The RONS can signal and generate oxidative damage to multiple cellular components ultimately resulting in cellular death.

Plasma itself has very unique properties that make it therapeutically valuable. To form plasma, an electric field is applied to a region of gas that strips electrons off the gas causing a breakdown of that gas. The resulting free electrons are accelerated by the electrical field, causing these electrons to not be in a state of thermodynamic equilibrium. The gas field that dominates is at room temperature while the electrons are at an elevated temperature. This temperature difference creates a reactive environment and the reactions of electrons and ions created from the background gas result in formation of metastable particles, reactive species, radicals, and also radiation. The process ultimately achieves an otherwise impossibly dry, chemically reactive environment at room temperature.

Transdermal drug delivery has a plethora of advantages over traditional methods of drug administration. Specifically, this delivery method has the ability to localize in a non-invasive way and allows for controlled and sustained release of a selected drug or molecule. Secondly, transdermal delivery avoids first-pass-metabolism which reduces the concentration of a drug before it can be absorbed by the circulatory system. Currently the main restriction that transdermal drug delivery encounters relates to the permeability of the skin. Low temperature plasma enables transdermal delivery of significantly larger drugs or molecules without damage at deeper layers of the skin such as the epidermis and dermis.

The depth of permeation and drug concentration can be regulated by controlling various electrical plasma parameters. Low temperature plasma-enabled skin poration (expanding of the skin pores) provides a non-invasive, safe means for transdermal delivery and cellular uptake of molecules, drugs and vaccines at room temperature and atmospheric pressure without the pain, skin irritation and other side effects associated with electroporation and other methods. Plasmaporation is achieved by applying oxidative stress from the RONS on the skin. Within the skin, as the low temperature plasma is applied, (known as Cold Atmospheric Plasmas or CAPs) the skin lipid structure develops a nanopore as the CAP treatment induces cross-linking of ceramides that pull the lipid structure open. The application of the method does not require disposable electrodes or needles, the need for disposal of biohazardous waste and illicit reuse of biohazardous consumables is eliminated. An additional benefit of using low temperature plasma is that of concurrent skin sterilization and plasmaporation to allow for larger drugs or molecules to permeate the skin.

Low temperature plasmas are known in combination with drug delivery. The ability of plasma to allow for alternations in skin composition for delivery, as briefly described above, is unique and produces unexpected results per previous embodiments in the prior art. Currently the equipment to administer delivery to patients, animals, or other in an efficient and precise manner does not exist.

A fully automated procedure to conduct this process has not heretofore existed. A current version of administration requires a constant moderation and continual updating of the frequency of operation. Resonance of the transformer, to create the electric field needed on the atmospheric gas, must always be achieved during the process; this requires a proper frequency to be maintained in order for the plasma portion of the system to operate consistently. In these previous embodiments, constant manual adjustment of the ideal frequency is required in addition to visual inspection of the plasma torch head to ensure a constant plume is present. Not only is the manual adjustment time consuming but the results are not reproducible for consistency of treatments.

The system can also change over time due to factors such as ambient temperature, and transformer or Metal Oxide Silicon Field Effect Transister (MOSFET) temperature. Once the system changes, the plume can become too small to be useable. This requires the operator to repeat the process of manually adjusting the frequency.

Robots are well established as a technology for replacing previous manual manipulations of a human worker, such as the robotic assembly within a factory line. The use of robots within medical environments is also well established in current modern medicine. Despite these advancements in robotics, medical injections are still predominantly done manually by a medical professional. In other uses, medical robots require a surgeon or other professional to operate the robot.

Thus, there is a long-felt need for an automated medical robot, one that only requires inputting the variables into computer software to then allow a complete automatic delivery of a full plasma and drug combination to predesignated sites on a patient. There is a need for this advanced treatment to be completely automated to promote consistent treatment results, eliminate the need for manual adjustments, and overall increase efficacy and efficiency of medical procedures and treatments.

BRIEF DESCRIPTION OF THE DRAWINGS

The invention is described in detail below with reference to the drawings wherein:

FIG. 15a is an exploded view of the robot attachment section of the dual-needle robot injector head shown in FIG. 12;

FIG. 15b is a perspective view of the robot attachment section of the dual-needle robot injector head shown in FIG. 12;

DETAILED DESCRIPTION

Figure 1:
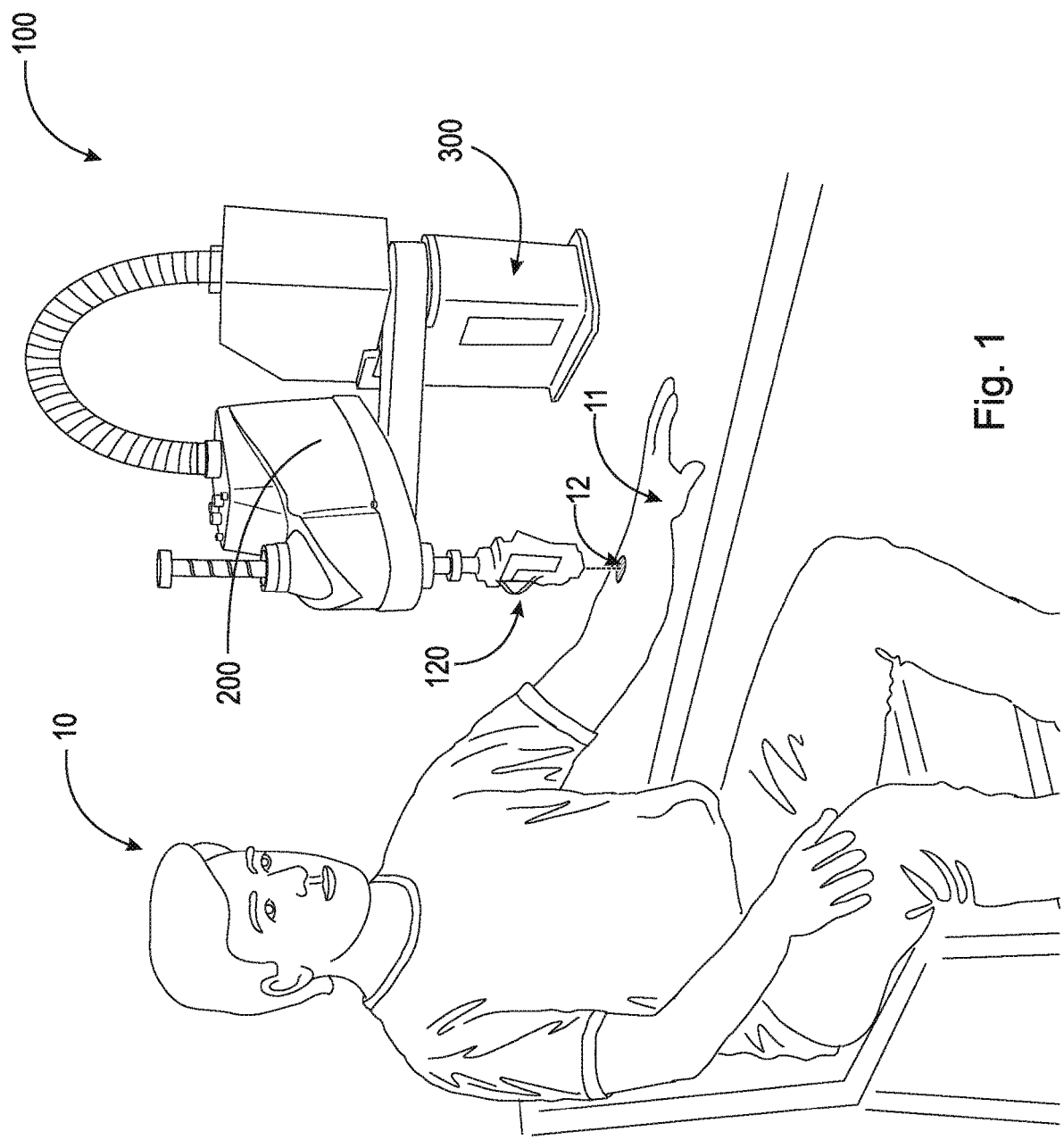
FIG. 1 is a perspective view of a patient with a melanoma tumor in position to receive a combination plasma-injection therapy provided by the apparatus for administering a cancer drug of the present invention, which is also shown in FIG. 1.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

The invention disclosed herein is an automated drug-gas treatment positioning and injection system that is capable of delivering a liquid drug through a needle or other means simultaneously, or intermittently, with a flow of gas containing a low temperature plasma stream that impinges the needle and/or treatment area while the drug is being injected or otherwise delivered.

In some embodiments, the automated system will deliver multiple injections at the site of a tumor, skin defect site, or other location on the surface of the body or within the body. For some treatments, tens or hundreds of individual injections may be required, while simultaneously delivering a gas flow, including a plasma stream that impinges the needle and/or the site of injections.

In some further embodiments, the automated system may be used for cosmetic skin care or delivery of other medications intracranially to the brain. The system may be used for injecting enhancers to wound healing such as collagen that could be employed on scar tissue post-surgery, e.g., C-sections or cosmetic surgeries.

The plasma stream is a state of matter, similar to the sun or stars, except non-thermal in nature. It is composed of multiple charged and non-charged species that include reactive oxygen species (ROS) and reactive nitrogen species (RNS) that damage cells resulting in a type of cell death whereby the cells shrivel up known as apoptosis. Under some plasma conditions, other forms of cell death are induced such as necrosis. In addition, the class of drugs that are induced by hypoxia and cause DNA damage also target cell death in the form of apoptosis. They may be inhibitors of topoisomerase, i.e., enzymes that participate in the over-winding or underwinding of DNA, and, thereby, prevent DNA repair as well as inducing DNA damage. This class of drugs may undergo a conformational change to assume a structural configuration of a free radical in hypoxic conditions. The combination therapy is significantly more effective than either agent alone, inducing an additive to synergistic effect. This treatment is beneficial by promoting cell death, particularly in cancer cells which have been shown to be selectively targeted as compared to normal cells. The spread of cell death has been shown to be amplified by the passage of free radicals and their potentially more stable derivatives through gap junctions. The device described above can be used to treat diseases that benefit from the delivery of both the non-thermal plasma and the DNA damaging agent in one device in a repeated pattern that can be selected for the dimensions of the tumor.

An added benefit is that the needle for the drug delivery can be designed to pass through the plasma between injections. This utilizes the other well-established function of the plasma which is to promote sterilization. This device is designed to prevent infection through the repeat sterilization of the needle for drug injections.

The device is primarily designed to treat various forms of cancer. It can treat tumors on the surface of the skin such as melanoma, basal cell carcinoma, and squamous cell carcinoma. This can be achieved through mapping the dimensions of the tumor and injecting the drug with plasma treatment multiple times following a grid-like pattern generated by computer analysis.

The device can also treat internal solid tumors directly during a surgery procedure with a repeated position of the plasma treatment and drug injection. This device has a stylus which senses the contact with the tumor surface and then injects the drug and emits the plasma at the same depth from the point of contact. This enables the treatment to reach the same depth independent of the contour pattern of the tumor. A stylus or other contact sensing device may be used to determine skin contact, such as optical sensors or audio sensors. The choice of sensor is determined by the type of treatment being administered, or disease being treated, thusly non-contact options may be selected. In addition to surface treatment with the plasma, an exchangeable adapter is used for the plasma head so that the plasma can be injected into the tumor site or the delivery head may be changed to an internal injection head. This can be achieved through the guidance of imaging such as MRI to identify the tumor depth.

The device can be used to inject through the body to target a tumor below the surface. This can be used to treat tumors of the body such as brain tumors, pancreatic tumors, colon tumors, stomach tumors, prostate tumors, breast tumors, and any solid tumor within the body. We have demonstrated the ability to inject the plasma through a 28-gauge needle which can be used to inject into the body in conjunction with drug injection through a separate needle to affect any internal solid tumor in the body.

The device can also be used as an adjuvant therapy to deliver the plasma/drug therapy to the region surrounding the area from which the tumor was removed under image guidance (MRI or other method). This method of targeting is designed to specifically kill the cancer cells that may remain following a surgical procedure. This method may prove to be highly effective in delivering the plasma/drug therapy to the sites from which a tumor recurrence may emerge. Thus, it may have a high efficacy in preventing tumor recurrence.

The device can also be used to combine one or more drugs with the DNA damaging agent in order to further enhance the therapeutic efficacy. The drug(s) added to the DNA damaging agent may be specific for different tumor types. Examples of agents include, but are not limited to antiangiogenic factors, specific gene targeting agents, immunotherapy agents, etc. The ideal dosing of any additional agents will be determined experimentally in combination with the DNA damaging agent and plasma combination. The agent(s) may also be used with the plasma in the absence of the DNA damaging agent for certain types of cancer.

The device can also be used for diseases other than cancer. Other diseases may include but are not limited to immunosuppressive conditions, musculoskeletal disorders, strokes, infections, diabetes, endocrine disorders, renal disorders, gastrointestinal disorders, skin diseases, respiratory ailments, cardiovascular disorders, neurodegenerative diseases, and lymphatic disorders. Essentially, any disease that would benefit from the repeated injection of any drug or drug combination with intermittent sterilization from non-thermal plasma could benefit from the use of this device.

Adverting now to the drawings, FIG. 1 is a perspective view of patient 10 presenting with a melanoma tumor 12 on skin surface 11 of his lower left arm. Patient 10 is shown in position to receive treatment from apparatus 100 for administering a cancer drug, or any other drug recommended for a selected. In a preferred embodiment, apparatus 100 delivers a drug injection in the presence of non-thermal plasma. It should be appreciated that a selected drug is store in a reservoir that is fluidly connected to Apparatus 100. Apparatus 100 includes robotic positioning device 200. In a preferred embodiment, the robotic positioning device is an Epson T3 SCARA model, although it should be appreciated that other robots can be used and programmed to perform the necessary cancer treatments of the present invention. Robotic positioning device 200 comprises drug delivery head 120, which may be surface drug delivery head 210 (shown in FIGS. 4A, 4B, and 6A-6D). It should be appreciated that internal injection drug delivery head 310 (shown in FIG. 12) is interchangeable with head 210 when treatment if desired below the skin surface.

As described previously, FIG. 1 is a perspective view of patient 10 presenting with abnormal area 12 on skin surface 11. Robotic positioning device 200 in a preferred embodiment is an EPSON T3 SCARA robot, programmed via an external robotic controller, discussed further infra, to position drug delivery head 120 to the abnormal area 12 for administration of combination drug non-thermal plasma injection.

Figure 2:
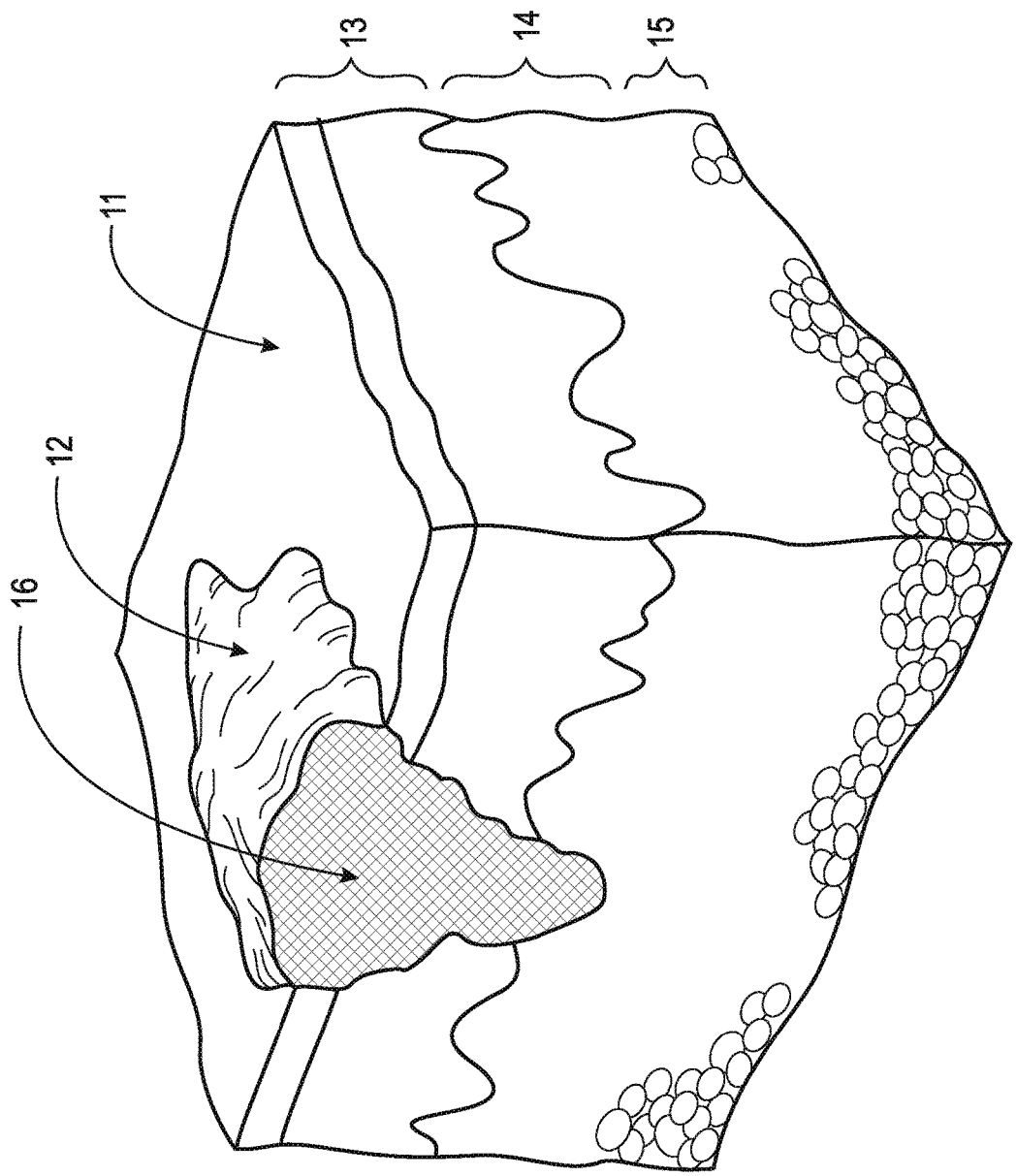
FIG. 2 is a cross-sectional view of human skin layers illustrating the melanoma tumor within those layers shown in FIG. 1.

FIG. 2 is a cross-sectional view of the human skin presenting with a melanoma tumor. Abnormal area 12 is the portion of melanoma tumor 16 that is visible on skin surface 11. Melanoma tumor 16 can reach varying degrees of depth within the skin depending on the grade of severity. FIG. 2 shows melanoma tumor 16 within epidermis 13 and penetrating dermis 14. Epidermis 13 is the surface epithelium of the skin, overlying dermis 14. Dermis 14 is a thick layer of tissue below epidermis 13 which forms the true skin, contains blood capillaries, nerve endings, sweat glands, hair follicles, and other structures. FIG. 2 shows melanoma tumor 16 has not reached the deepest layer of the skin, hypodermis 15. Hypodermis 15 is also known as the subcutaneous layer or the superficial fascia and serves to connect the skin to the underlying fascia or fibrous tissue of the bones and muscles.

Robotic Positioning Device

Figure 3:
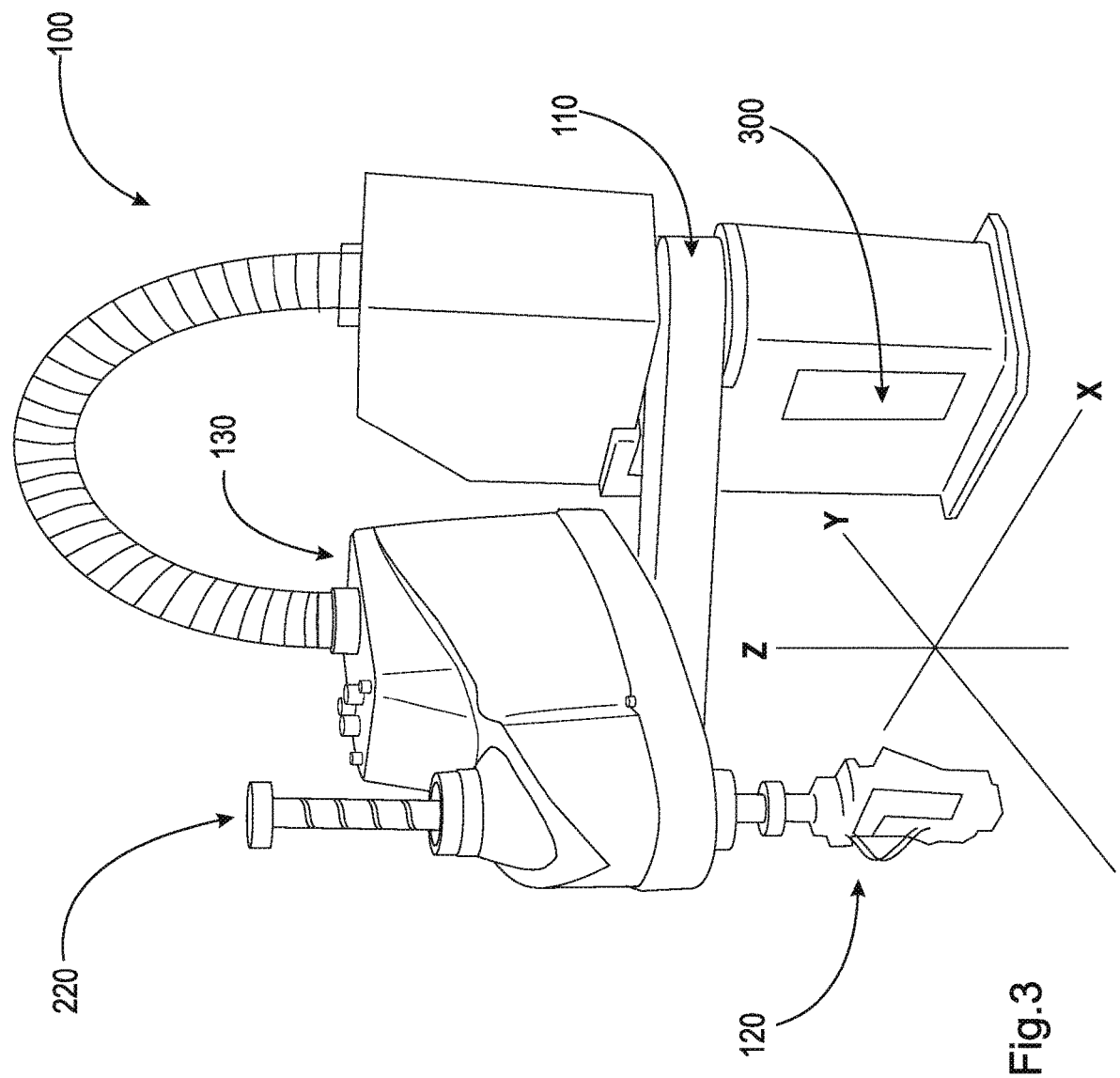
FIG. 3 is a perspective view of the robotic positioning device of the invention, shown with a drug delivery head in position.

FIG. 3 is a perspective view of robotic positioning device 100. Robotic positioning device 100 may be any device suitable to position delivery head 120 to required locations that are specified for treatment based on commands delivered to robotic positioning device 100. It should be appreciated that delivery head 120 could comprise surface delivery head 210 or internal (beneath the surface) delivery head 310, described infra. Commands are delivered remotely, and preferably electronically. In the simplest embodiment, robotic positioning device 100 may be a linear positioning slide that is capable of moving delivery head 120 along a single axis to various positions along that axis so that the delivery head can provide at least drug and gas flow at that position. In this case, after delivery head 120 has been moved to a desired position, the delivery head may provide a flow of drug and gas onto the surface requiring treatment at that position. To inject a drug below the skin surface, the surface would need to be raised up in this embodiment. Alternatively, a second axis of movement can be added that is capable of lowering the delivery head 120, or at least a drug delivery needle, for drug injection below the surface. Along these lines, one can envision numerous embodiments where robotic positioning device 100 has three (3) or more, axes of position control, allowing greater control over the position of delivery head 120, including the use of multi-axis articulated robots as robotic position device 100, with more axes allowing control over the angle of delivery head 120 with respect to the surface requiring treatment.

In some embodiments, robotic positioning device 100 is an articulated robot that has at least two-axis position control, as is well known in the art of robotics. An articulated robot may include numerous rotary joints as well as linear positioning elements. Well known devices such as a 'robotic arm' are included. Articulated robots include simple two devices as well as devices that have more than eight interacting joints. Articulated robots of the preferred embodiments are powered by electric motors, but other means such as hydraulics, pneumatics, and combinations thereof may also be employed. The most important features of robotic positioning device 100 include the number of control axes (which may also be referred to as the degrees of freedom (DOM) and dictates the ability of robotic positioning device 100 to position delivery head 120 to a desired location, as well as to a specific approach angle, etc.), reach (distance from the robot base to the furthest point that treatment can be delivered), coverage area (amount of area that can be treated by the robot), accuracy (how close robotic positioning device 100 can achieve a pre-determined treatment location), repeatability (variation in the location of delivery head 120 from cycle-to-cycle, when attempting to reach the same point), and the resolution (the smallest increment of movement that the robotic positioning device 100 can move or detect).

As shown in FIG. 3, in a preferred embodiment, the robotic positioning device 100 is an Epson 4-axis SCARA robot. Robotic positioning device 100 comprises robotic arm 110 that moves delivery head 120 about the X and Y-axis at robotic controller 300. Motor housing 130 is connected to robotic arm 110 at the opposite end from robotic controller 300. The connection of motor housing 130 and robotic arm 110 rotationally positions motor housing 130 about the X and Y-axis. Motor housing 130 comprises Z-axis shaft 220. Z-axis shaft 220 attaches to delivery head 120 at the distal end and positions delivery head 120 vertically about the Z-axis and provides rotational adjustments.

This robot includes on-board robot control electronics that serves as the robotic controller. Robotic controller 300 is an integrated system that is programmable with the Epson robot from an external computer running the software and connected to the robot via a standard USB cable. The controller stores the programmed data and handles execution of all commands, including operation of each axis motor, sensing and interpreting position data for each axis, and communication with the external equipment through built in input/output (I/O) connections. This I/O is not capable of delivering power to external equipment, as it is limited to delivering and sensing voltage with little associated amperage. Therefore, in this embodiment, an external electronics interface is included that contains relays to convert the robot output signals to power outputs, as described below.

The EPSON T3 SCARA robot is controlled through proprietary software, EPSON RC+7.0. This software is downloaded onto a computer to control all aspects of the robotic work cell. In the current embodiment it is operable on Windows computers and can connect one computer with multiple controllers. Some other key features include database access and background tasking. The program also contains options for the user such as an integrated vision robot guidance system, a conveyor tracking option, and a GUI builder option. These options are easily added to the EPSON RC+7.0 program via a download. EPSON RC+7.0 has a relatively simplistic GUI with one main parent window and multiple child windows that can be running simultaneously. The EPSON RC+7.0 software controls the robot controller through a USB or Ethernet connection. With EPSON RC+7.0, it is possible to develop application software for the SPEL+language that runs in the RC700 controller. The RC700 Controller is used to control a series of EPSON SCARA robots. This controller features a built-in motion system that can control up to six axes simultaneously.

SPEL+ is a programming language that runs on the RC700 Controller. This program is similar to the BASIC computer software program. This language supports multitasking as well as motion control and input/output control. SPEL+ programing includes variables, functions and macros with every project containing a function named "main". To define a function, you start with a function statement and end with a "Fend" statement. In order to properly call a function a "call" statement is used.

The software and the controller, once connected, can be used in a variety of different ways. A slave system can be created with the PC cell slave and the controller PLC. The program is developed with EPSON RC+7.0 and the object code is then saved to the controller. Once saved, the controller does not need to be connected to the computer. The controller is then operated by a fieldbus or I/O. A standalone system can be created to control the robot and the associated equipment as the robot controller. An offline development system can also be created.

This allows for the program edition and project build to be checked at any time by the offline PC. The EPSON RC+7.0 and the Controller can also be used in a simulation environment. By using a virtual I/O, EPSON RC+7.0 can execute a program without the actual 110 or robot.

It should be appreciated that any articulated robot, discussed supra, may be used to position the delivery head to a treatment area.

Delivery Head

The delivery head is fixed to the end of the Epson robot shaft and oriented to provide access to the integrated needle to the treatment surface fixed below the delivery head. The delivery head, when positioned, delivers a selected drug, from a reservoir to a patient while administering non-thermal plasma to the treatment surface during the injection.

Figure 4A:
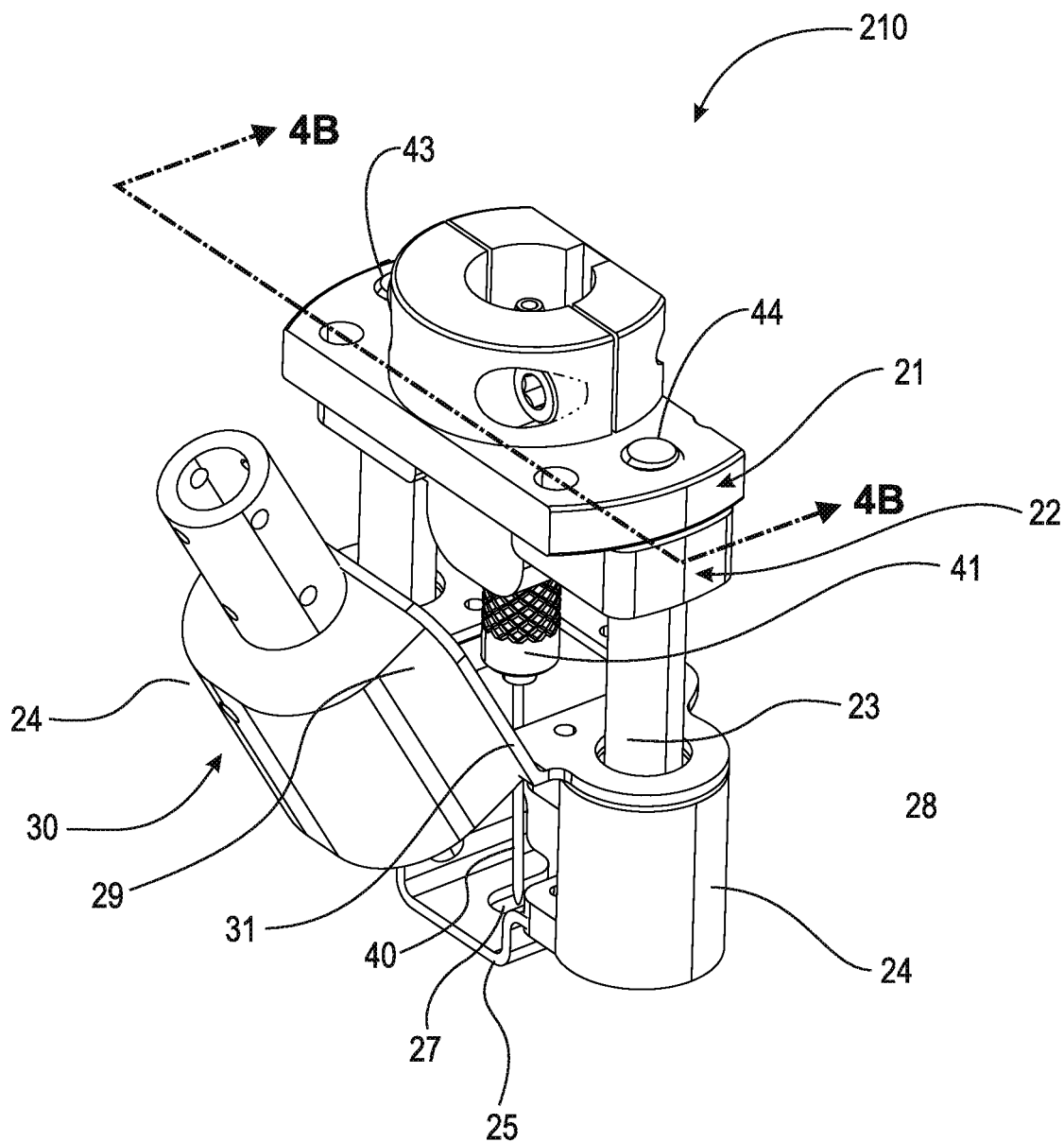
FIG. 4A is a perspective rear view of the drug delivery head shown in FIG. 3.
Figure 4B:
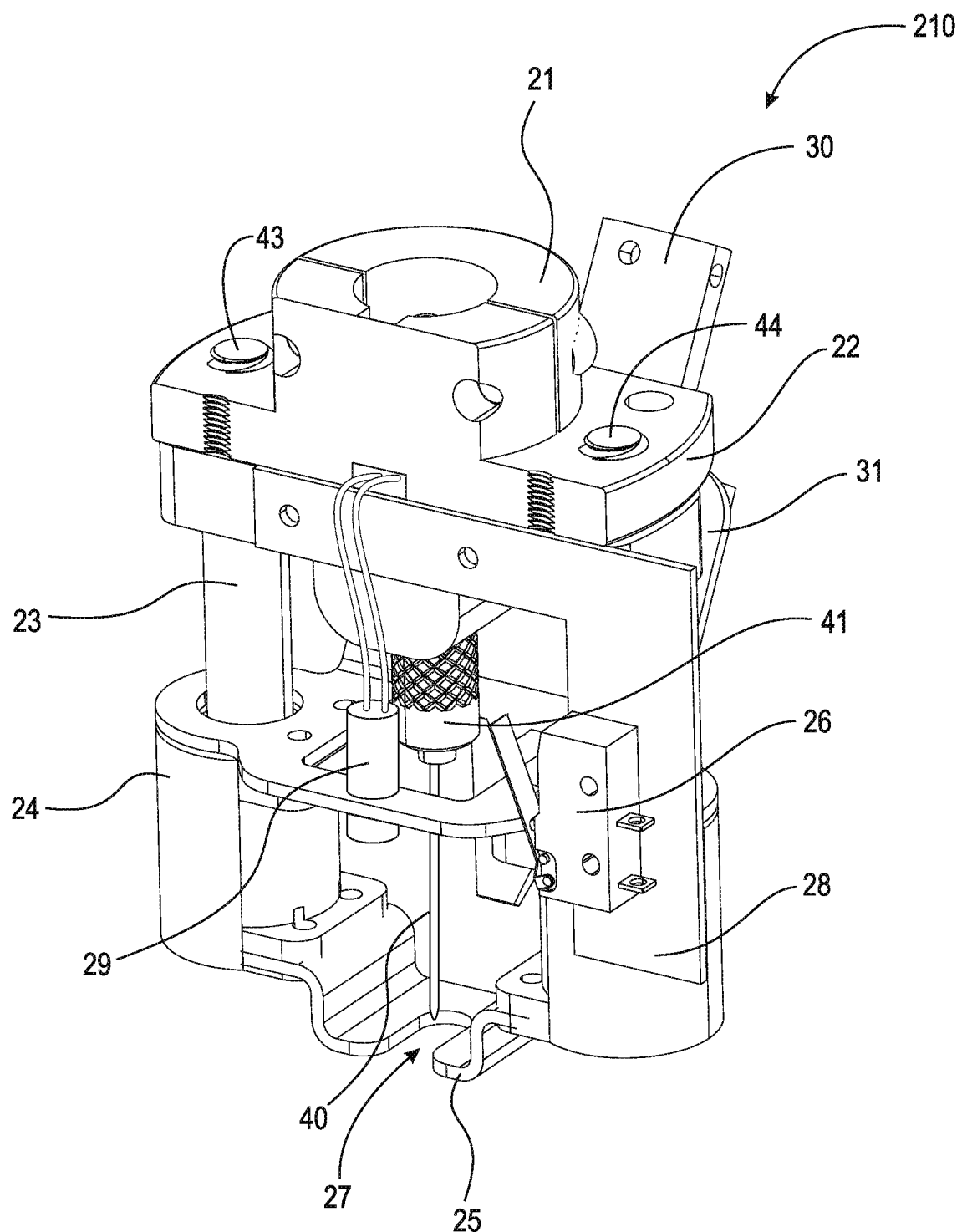
FIG. 4B is a perspective front view of the drug delivery head shown in FIG. 4A, but with part of the needle mount of the drug delivery head cut away.
Figure 5A:
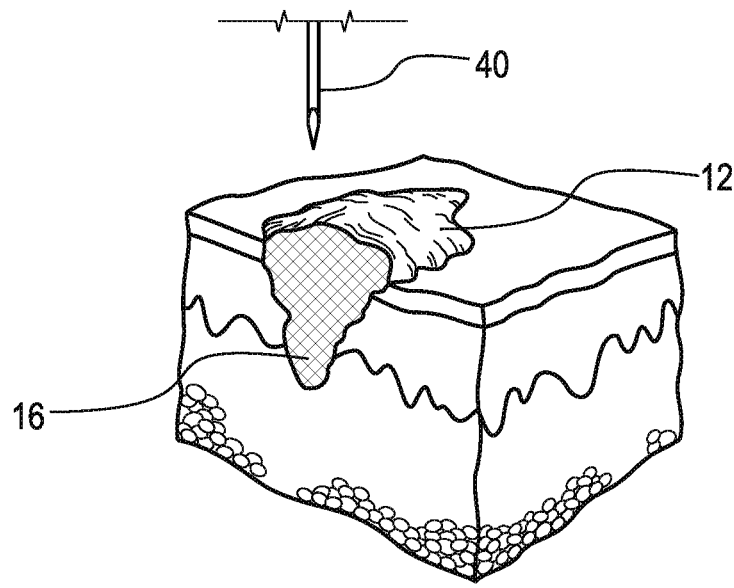
FIG. 5A is a cross-sectional view of the melanoma tumor within skin layers shown in FIGS. 1 and 2, showing schematically a drug delivery needle approaching the surface of the tumor.
Figure 5B:
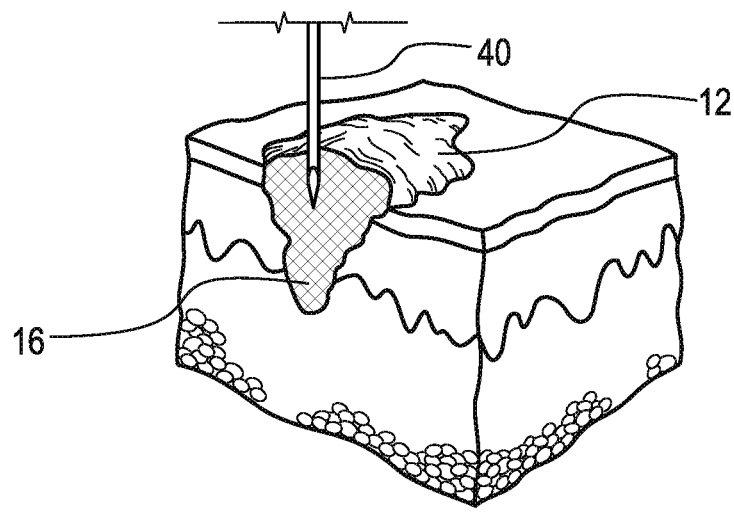
FIG. 5B is a cross-sectional view similar to that of FIG. 5A, except showing the drug delivery needle penetrating the surface of the tumor moving into position to administer a cancer treatment drug.
Figure 5C:
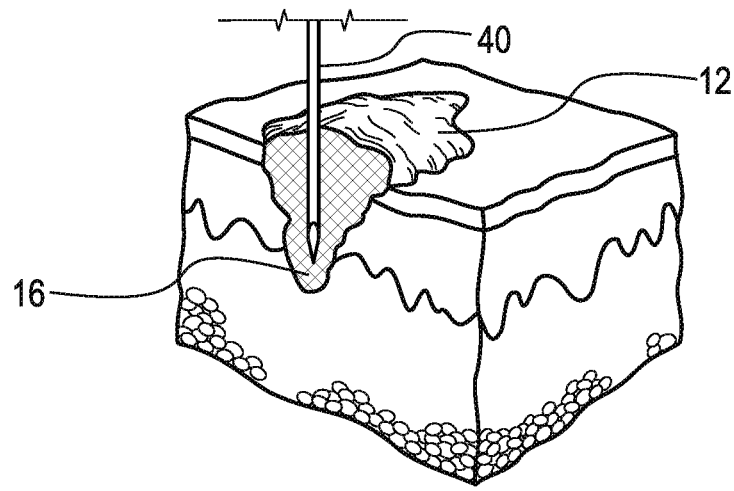
FIG. 5C is a cross-sectional view similar to that of FIG. 5B, except showing the drug delivery needle further embedded within the tumor to administer the selected drug.

FIGS. 4A and 4B illustrate surface delivery head 210. For ease in understanding, the surface delivery head has been removed from the robot in this drawing. Base pusher 25 is located on the bottom of surface delivery head 210. This piece of the assembly distributes pressure over the skin of the patient while parts of the head are in a downward motion to initiate skin contact with a limit switch. Base pusher 25 contains slit 27 arranged for passage of needle 40 when injecting a drug into the patient's skin.

Figure 7:
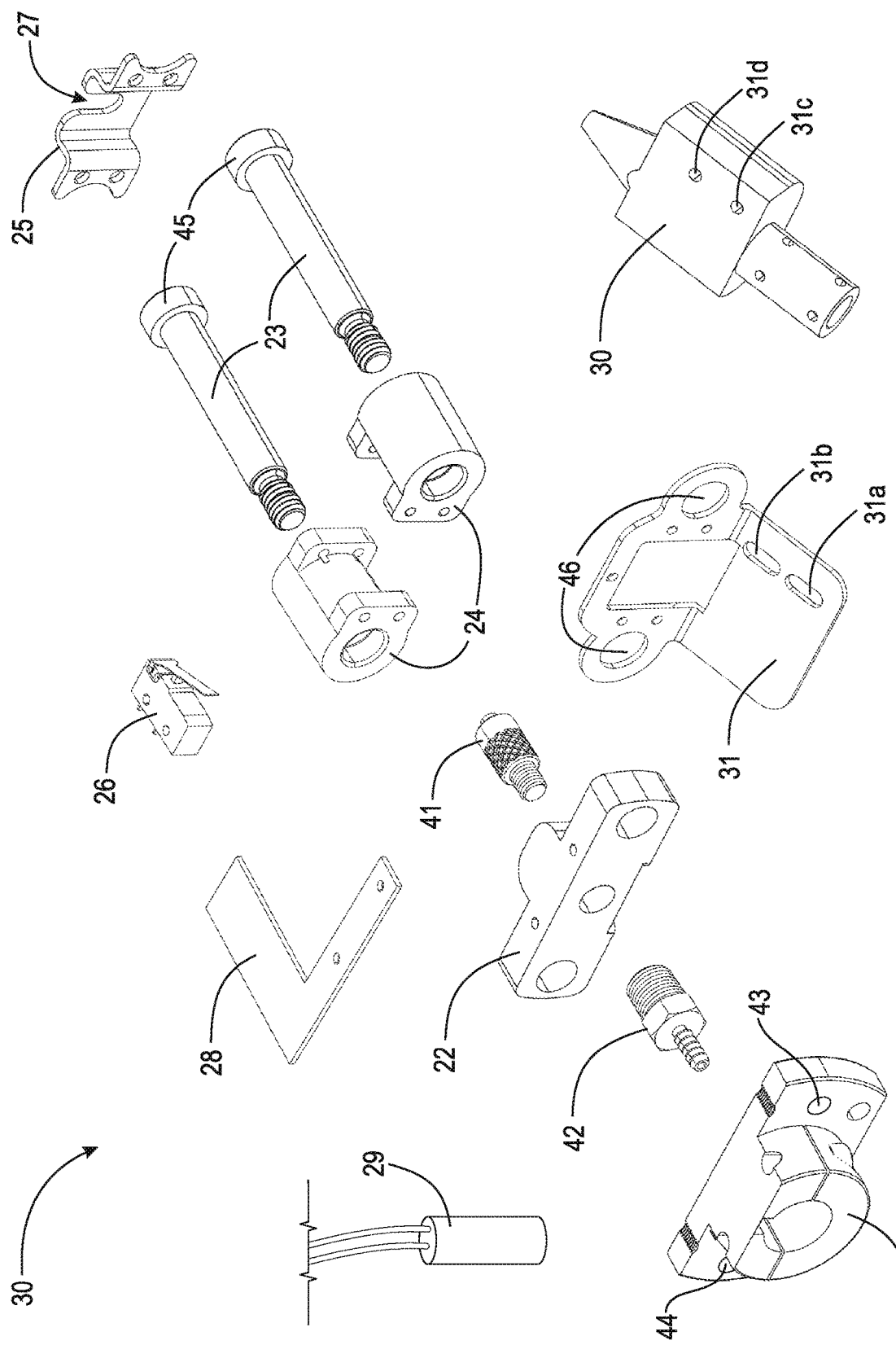
FIG. 7 is an exploded view of the drug delivery head.

Needle mount 22 connects needle 40 and a pumping tube (not pictured) to delivery head 20 to allow for the injections to take place. In the center of needle mount 22, turn-tube coupling 41 and hose fitting 42 (shown in FIG. 7) are connected. Needle 40 is pointed downwardly and attached to turn-tube coupling 41 which is attached on the bottom end of needle mount 22. At the top of needle mount 22, hose fitting 42 (shown in FIG. 7) is connected. Hose fitting 42 fits inside the inner diameter (ID) of flanged shaft collar 21 when the assembly is connected. Two through-bores 43, 44, in the sides of needle mount 21 are used to fit two nylon bushings 45 and nylon shoulder 23. Nylon bushings 45 fit loosely inside the inside diameter of through-bores 43 and 44. Spring 48 is located around shoulder screw 23 and does not fit into through-bores 43 and 44 of needle mount 21. The bottom of needle mount 22 stops spring 48 from traveling towards the top of the assembly when it is being compressed during operation.

Plasma head 30 connects to plasma head mount 31 with screws. Plasma head 30, in combination with gas delivery system 700, signal/function generator 560, plasma generator 500, and external electronics interface 400 (FIG. 8, FIG. 10, and FIG. 11) has the features necessary to create the desired plasma for the system in operation and is discussed in greater detail infra.

Switch bracket 28 is used to connect subminiature snap acting switch 26 to needle mount 22. Switch bracket 28 is connected to needle mount 22 with screws.

Plasma head mount 31 is fixed to two slide guides 24 by screws. Through-bores 45 in plasma head 31 allow shoulder screw 23 and nylon bushings 45 to pass through but they do not allow spring 48 to pass through. The top portion of plasma head mount 31 stops spring 48 from traveling towards the bottom of the assembly when it is compressed. Plasma head mount 31 is also a connection point for plasma head 30, described in more detail below.

Slide guides 24 are located between plasma head mount 31 and base pusher 25 and fixed to both plasma head mount 31 and base pusher 25 with screws. Slide guides 24 allow the shaft of shoulder screw 23 to pass through slide guide 24 while stopping nylon bushings 45 of the shoulder screws 23 from passing through.

Flanged shaft collar 21 is located at the very top of delivery head 210 with needle mount 22 directly below it. Flanged shaft collar 21 is used to connect to Z-axis shaft 220 with delivery head 210. The inner diameter of flanged shaft collar 21 allows for Z-axis shaft 220 to fit in. Flanged shaft collar 21 is secured to Z-axis shaft 220 by tightening the screws located at the top of flanged shaft collar 21 and connected to the rest of delivery head 210 by shoulder screws 25. Shoulder screws 25 are threaded into the bottom of flanged shaft collar 21. The bottom of flanged shaft collar 25 acts as a stopper for nylon bushings 45.

Delivery head 210 is used to combine robotic positioning device 100 with the pump and plasma system. Delivery head 210 is used to distribute non-thermal plasma and the fluid to the desired area on a patient. The functionality of delivery head 210 can primarily be seen in the injection phase of the process. As the program finds an injection site it begins to lower delivery head 120 towards the treatment area. The first point of contact between delivery head 210 and the patient is base pusher 25. Base pusher 25 is connected by bolts to slide guides 24. Slide guides 24 are connected to flanged shaft collar 21 with needle mount 22, plasma head mount 31, nylon bushings 45, and springs 48 in between. Shoulder screw 23 extends through each of slide guides 24 through nylon bushings 45, through needle mount 22 to be threaded into flanged shaft collar 21. Spring 48 is located atop nylon bushing 45. Once base pusher 25 contacts a treatment surface it stops in place along with the attached slide guides 24. The rest of delivery head 210 continues downward, compressing springs 48 until subminiature snap acting switch 26 mounted on needle mount 22 via switch bracket 28, is contacted by plasma head mount 31 stopping the downward motion in the program. This operation functions to initiate skin contact for the programming without needle 40, once skin contact is achieved, needle 40, fixedly secured to quick turn tube coupling 41, is put into the patient skin. Once a signal from this skin contact limit switch is sent to the program, robot positioning device 200 and non-fixed components of delivery head 210 continue in the Z-axis direction, further compressing the springs until the injection depth, determined by the variables of the program, has been met. Once needle 40 depth is achieved, the pumping operation begins. After the pumping program is completed, robot positioning device 200 moves Z-axis shaft 220 upwards, removing needle 40 from abnormal area 12 and decompressing springs 48 in delivery head 210.

Figure 6A:
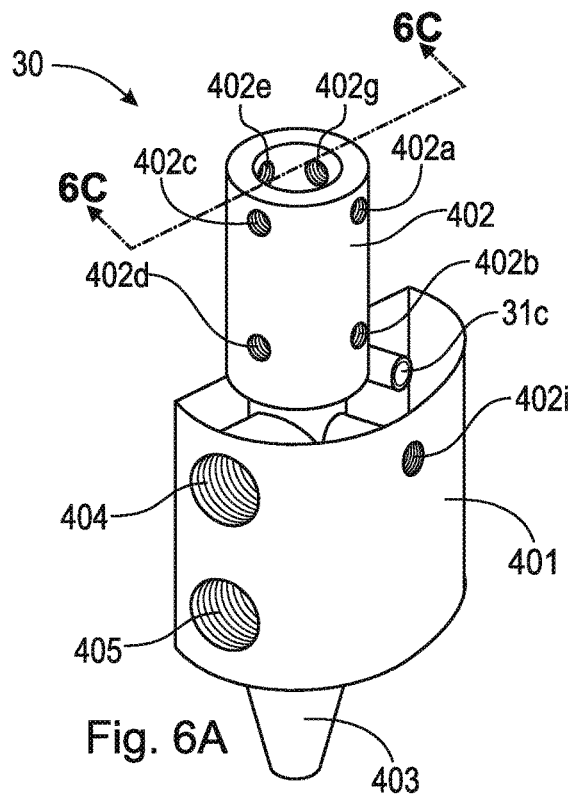
FIG. 6A is a perspective view of the plasma head of the invention without the plasma electrode, gas tubing connection, electronic connection, or fastening components.
Figure 6B:
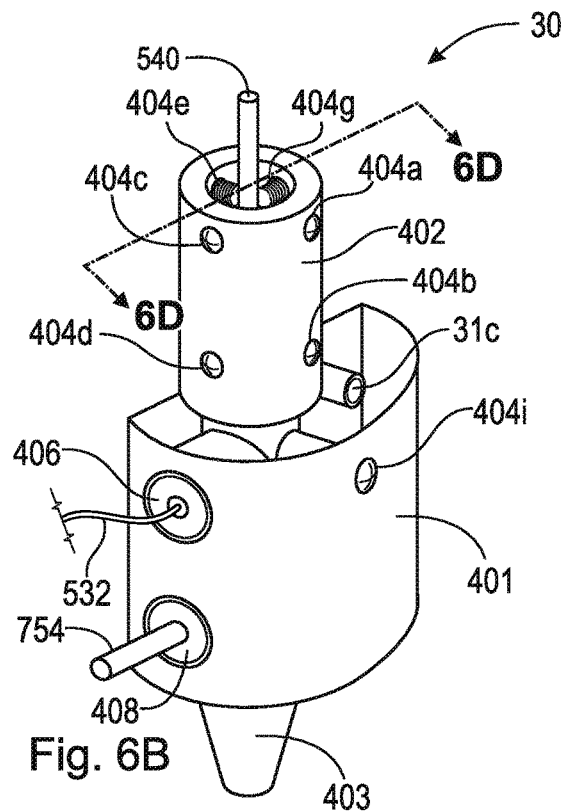
FIG. 6B is a perspective view of the plasma head of the invention with the plasma electrode, gas tubing connection, electronic connection, and fastening components.
Figure 6C:
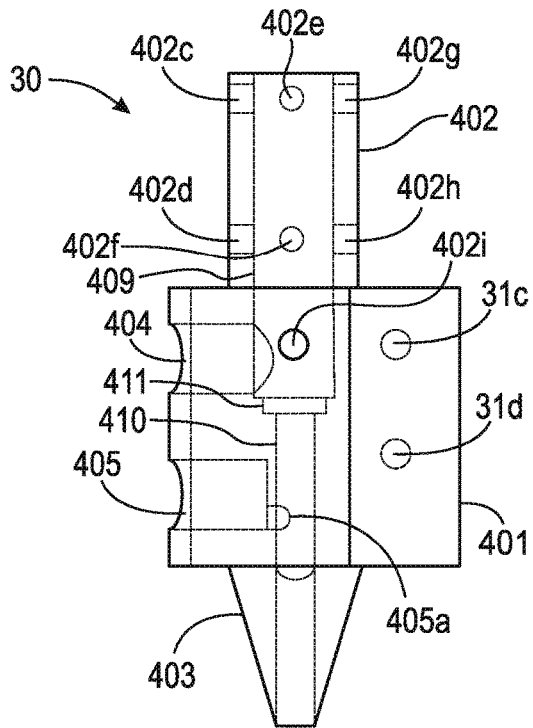
FIG. 6C is a sectional view of the plasma head shown in FIG. 6A cut along line 6C-6C.
Figure 6D:
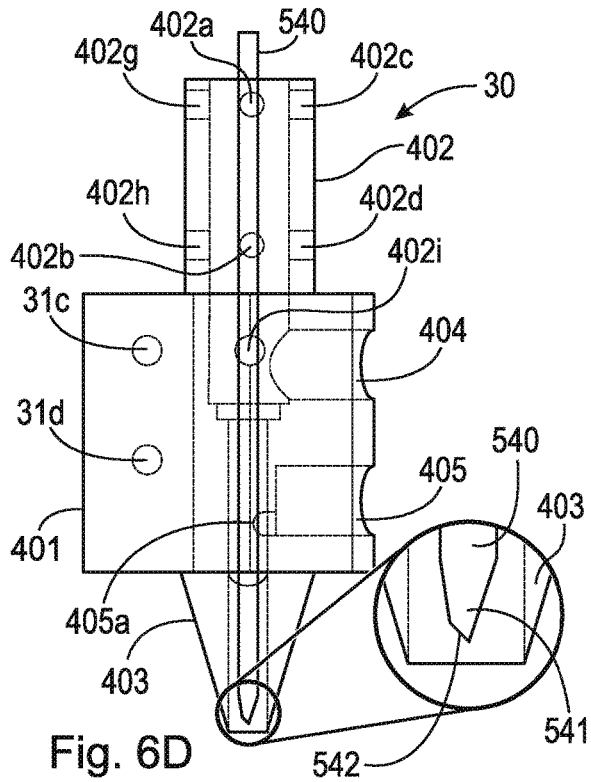
FIG. 6D is a sectional view of the plasma head shown in FIG. 6B cut along line 6D-6D.

Adverting now to FIGS. 6A-6D. FIG. 6A is a perspective view generally showing plasma head 30 without the plasma electrode and additional components. FIG. 6B is a perspective view of plasma head 30 of the invention with plasma electrode 540, gas tubing connector 408, BNC (Bayonet Neill—Concelman) connector 406, and electrode mounting screws 404a-404i. FIG. 6C is a sectional view of plasma head 30 shown in FIG. 6A, cut along line 6C-6C. FIG. 6D is a sectional view of plasma head 30 shown in FIG. 6B, cut along line 6D-6D, without gas tubing connector 408, BNC connector 406, and electrode mounting screws 404a-404i. Plasma head 30 generally comprises three parts: plasma head main body 401, upper electrode coupler 402 and tapered delivery port 403 that have inner through-bores 409, 410, and 411, respectively. In a preferred embodiment, plasma head main body 401, upper electrode coupler 402, and tapered delivery port 403 are a singular fixed piece, although they may be comprised of separate components. Plasma head main body 401 has two threaded mounting tubes, 31c and 31d that are fixed to main body 401. Threaded mounting tubes, 31c and 31d that are arranged to threadably attach plasma head 30 to plasma head mount 31 through-bores, 31a and 31b (shown in FIG. 7). Plasma head main body 401 also comprises wire connector aperture 404, gas tube connector aperture 405, and electrode mounting screw aperture 402i. Upper electrode coupler 402 is a hollow cylinder that comprises a plurality of electrode mounting screw apertures, 402a, 402b, 402c, 402d, 402e, 402f, 402g, and 402h that are arranged to accept a plurality of electrode mounting screws. Upper electrode coupler 402 and plasma head main body 401 each comprise upper electrode aperture 409 (FIGS. 6C and 6D). Upper electrode aperture 409 (FIGS. 6C and 6D) transitions into lower electrode aperture 410 at aperture transition 411 within plasma head main body 401 and tapered delivery port 403.

Figure 8:
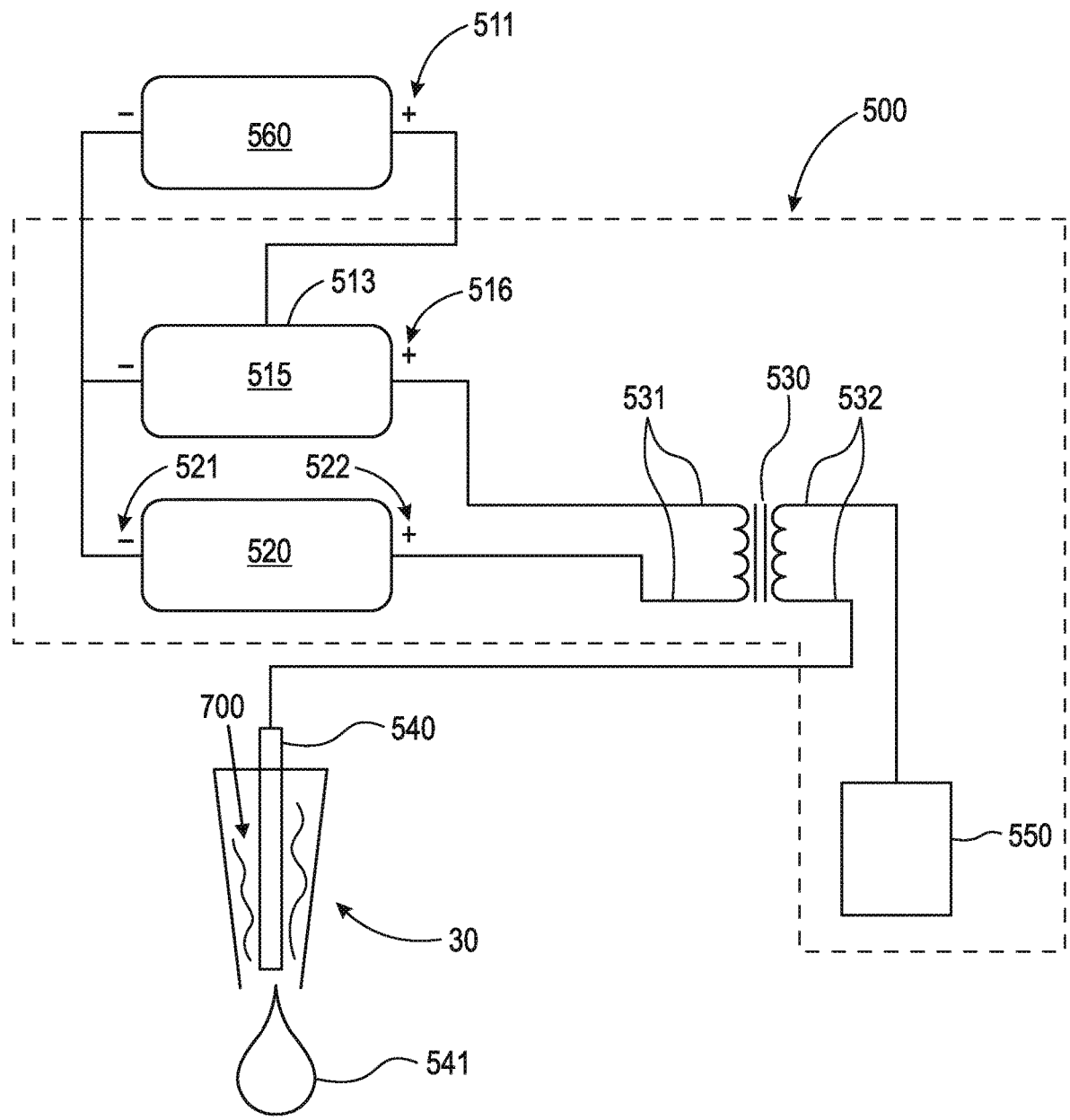
FIG. 8 is a schematic of the electronic interface of the plasma generator.

FIG. 6B is a perspective view generally showing plasma head 30 with plasma electrode 540 and additional components, discussed herebelow. Plasma electrode 540 is in a preferred embodiment is made of tungsten, however any metal that is suitable to sustain the necessary plasma plume may be used. Electrode 540 is inserted into upper electrode through-bore 409 and lower electrode through-bore 410 at the top opening of upper electrode coupler 402, passing through plasma head main body 401 and tapered delivery port 403. To secure electrode 540 within plasma head 30 plurality of mounting screws 404a, 404b, 404c, 404d, 404e, 404f, 404g, 404h, and 404i, are tightened around the body of electrode 540. Plurality of mounting screws 404a, 404b, 404c, 404d, 404e, 404f, 404g, 404h, and 404i, allow electrode 540 to be finely adjusted to ensure it is centered within upper electrode through-bore 409 and lower electrode through-bore 410. Upper electrode through-bore 409 and lower electrode through-bore 410 transition at middle through-bore 411. Electrode 540 in a preferred embodiment, is terminated approximately 1 mm within lower electrode through-bore 410 in tapered delivery port 403. BNC connector 406 is threadably secured to wire connector aperture 404. BNC connector 406 comprises secondary winding 532 that lead from kHz frequency transformer 530 (FIG. 8). BNC connector 406 contacts electrode 540, energizing electrode 540 via transformer 530 (FIG. 8).

It should be appreciated that BNC connector 406 is not the only way to connect secondary winding 532 to electrode 540. One of plurality of mounting screws 404a, 404b, 404c, 404d, 404e, 404f, 404g, 404h, and 404i may be connected to secondary winding 532, as their contact with electrode 540 will still energize electrode 540. Electrode 540 may also be energized by clamping an alligator clip that is connected to secondary winding 532 to the top end of electrode 540 that is protruding from upper electrode coupler 402.

Figure 11:
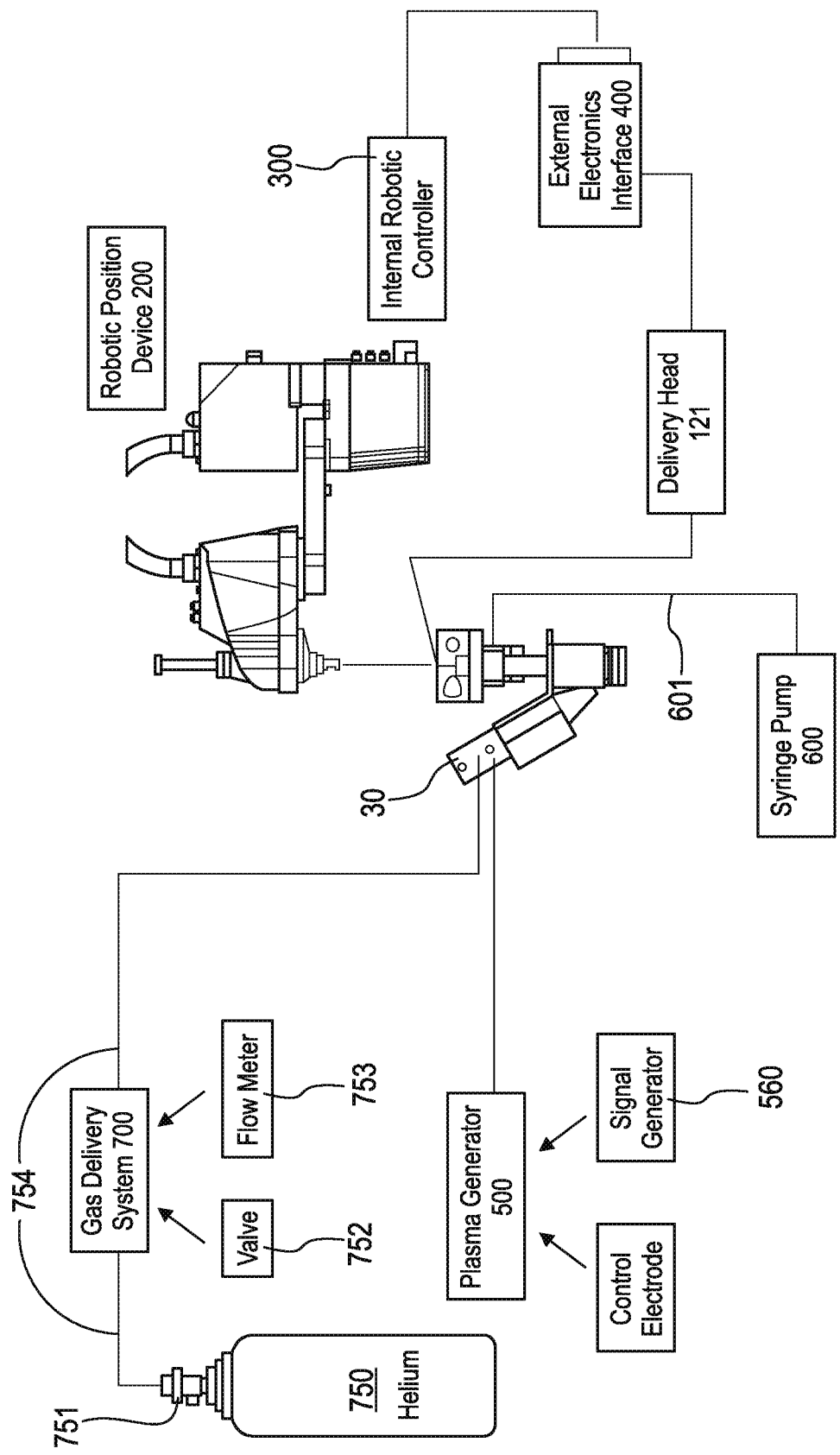
FIG. 11 is a complete schematic of the robotic positioning device with the drug delivery head, gas delivery system, plasma generation system, drug delivery system, external electronics interface system, and the internal robotic controller.

In order to deliver a gas to be energized by BNC connector 406 and electrode 540, gas tubing connector 408 is threaded into gas tube connector aperture 405. The controlled flow of helium is delivered to gas tubing connector 408 gas tubing 754 from gas delivery system 700 (FIG. 11). Gas tube connector aperture 405 directs the flow of helium into lower electrode through-bore 410 by way of through-bore 405a and helium is directed over and around electrode 540. When the directed helium flows on and around electrode 540 it then flows out of tapered delivery port 403 as energized plasma.

Electrode 540 further comprises tip 541 that is preferably cut to produce 45° angle 542. Although tip 541 of electrode 540 may be cut at different angles, the resulting 45° angle 542 and termination of tip 541 at the preferable 1*mm* distance from the distal end of tapered delivery port 403, produces an optimal and consistent plasma plume to encapsulate needle 40 (FIGS. 4A and 4B). Although an optimal and consistent plasma plume is created the claims contemplate the adjustment of the plume to account for external changes that could be expected from extensive operation.

Plasma head 30 is mounted onto delivery head 210 in such a way as to deliver the energized plasma to a predetermined location, discussed supra. For example, the flow of energized plasma is directed to impinge the end of the needle 40 such that it sterilizes needle 40 (FIGS. 4A and 4B) and provides energized plasma to the skin near the site of injections.

Adverting now to FIG. 11, FIG. 11 illustrates a block diagram representing the key components of the robotic system including a robotic positioning device 200, internal robotic controller 300, external electronics interface 400, plasma generator 500, signal/function generator 560, gas delivery system 700, gas supply 750, plasma head 30 and delivery head 121 that includes syringe pump 600.

External electronics interface 400 includes components to support the operation of the system, including electronic relays that receive control signals from the robotic controller 300 to facilitate operation of the entire system. For example, in a preferred embodiment with the Epson 4-axis Scara robot, the 110 of the integrated robot controller 300 is limited to signal generation and detection, and external relays must be used to generate power for system components desired to be controlled automatically through the robot program. For example, the Epson controller may be programmed to turn on a laser diode used to align the delivery head at certain points during the system operation. To accomplish this, the Espon controller is programmed to turn an output pin to a high state (nominally 24 volts direct current) which is not capable of driving the laser diode directly. Therefore, this pin is wired to drive the gate of a transistor, relay, or other solid-state device, which, in turn, powers the laser diode when the designated drive pin is set to high. As is well known in the art of electronics, a low state may also be used to switch the laser diode on depending on the type of solid-state device used. In a similar manner, inputs on the robot controller may be linked through external relays located within the external electronics interface. Items that may be linked through the external electronics interface include the state and/or relative location of the treatment surface detection sensors with respect to the treatment surface, switching on and off of the drug delivery pump or other equipment, sensing the state (on, off, error, etc.) of the drug delivery pump or other equipment, switching on and off and/or sensing the state (on, off, error, etc.) of various components within the plasma generator system and/or gas supply system, emergency needle retraction button, emergency off button, and/or any other equipment useful during the operation of the treatment device.

Syringe pump 600 is an automated and programmable device known in the art that comprises a drug reservoir and drug tubing 601. Pump 600 is a programable pump that allows a user to select a dosage amount of a loaded drug into the drug reservoir. In a preferred embodiment, pump 600 is a World Precision Instruments ALADDIN-1000 syringe pump, although any commerical syringe pump that is automated and programmable may be used. Drug tubing 601 connects pump 600 to either surface drug delivery head 210 or internal injection drug delivery head 310. Drug tubing 601 is connected to turn-tube coupling 41 and specifically hose fitting 42 of surface drug delivery head 210. Alternatively, drug tubing 601 transitions to drug delivery tube 331 where it meets Luer lock hose fitting 332a of internal injection drug delivery head 310.

Plasma generator 500 is designed to produce a low-temperature plasma and/or low-energy plasma, and in certain cases may be designed to specifically produce a non-thermal plasma (NTP), that is defined in a preferred embodiment by a gas ionizing flow that has less than 1 watt of coupled power. However, a gas ionizing flow that has less than 1 watt is only one definition of a low-temperature plasma and/or low-energy plasma and the present invention may used, such as plasmas defined at different watts of coupled power greater than 1 watt. The plasma is generated by flowing a suitable gas stream over an electrode that is operating at high voltage and high frequencies. In a preferred embodiment, a gas stream utilizing helium is used. However in alternative embodiments, neon, and other gases, or gas mixtures may be used to achieve a desired plasma stream.

The ROS/RNS most readily detected in cell culture media treated with plasma are hydrogen peroxide ($H_2O_2$), hydroxyl radical ($^{\cdot}OH$), singlet oxygen ($^1O_2$), superoxide radical ($O_2^{\cdot-}$), nitric oxide ($NO^{\cdot}$) and nitrite/nitrate anions ($NO_2^-/NO_3^-$). ROS and RNS are regarded as the key substances in NTP that affect cell responses. Relatively short-lived ROS or RNS produced in media by NTP irradiation may be converted to other relatively long-lived species such as $H_2O_2$ or nitrate/nitrite (NOx), respectively, which promote high and sustainable reactivity.

FIG. 11 shows plasma generator 500 which includes several components, discussed in view of FIG. 8 infra, as well as gas delivery system 700. In other embodiments, a commercial plasma generator may be used such as a 13.5 MHz plasma system.

In some embodiments, signal/function generator 560 is capable of generating a periodic wave, preferably in the range of 50 kHz to 500 kHz, at an amplitude sufficient to properly control electronic amplifier 515 (FIG. 8) of the control circuitry and be in the form of a sine wave, square wave, or other periodic wave. The specific frequency used to generate a plasma depends on various factors, including transformer design, circuitry, wire length, presence of optional measurement equipment and overall system configuration. The drive frequency is set to match the resonant frequency of the system, and may be adjusted during operation to adjust for changes in this resonant frequency due to temperature, humidity, and other factors that may impact the system's resonant frequency. The output from function generator 510 (FIG. 8) is delivered on the device via a standard 2-lead BNC connector to the control circuitry.

In other embodiments, other frequencies may be used, including frequencies in the mega-hertz range. The most important aspect of the plasma generation is the creation of radicals within the gas stream in and beyond the plasma zone.

Referring to FIG. 8, plasma generator 500 and signal/function generator 560 are powered by DC power supply 520. Negative lead 521 of power supply 520 is connected to signal/function generator 560 and electronic amplifier 515.

Positive lead 511 of signal/function generator 560 is connected to gate 513 of electronic amplifier 515. The output of electronic amplifier 515 is connected to kHz frequency transformer 530 at first primary winding 531. Secondary winding 532 provides the high frequency signal to electrode 540 to produce the plasma. In a preferred embodiment, electronic amplifier 515 is an N-Channel MOSFET part number IRF540NPBF made by Infineon Technologies, and is preferably mounted on a heat sink and cooled by forced air from a fan sufficient to maintain the maximum temperature of the MOSFET below 175 degrees Celsius and more preferably below 125° C.

Adverting back to FIG. 11, gas delivery system 700 includes gas supply tank 750, pressure regulator 751, gas flow control valve 752, gas flow meter 753, and gas delivery tubing 754. Gas is supplied by pressurized gas supply tank 750 to gas tubing 754 which delivers gas to gas flow control valve 752 followed by gas flow meter 753. Gas delivery tubing 754 is used to deliver the controlled and metered gas flow to the electrode-gas delivery fitting 408 of delivery head 30 or to Yor-Lok fitting 321 of internal injection delivery head 310. In a preferred embodiment, the gas control valve and gas flow meter are combined into a single device such as a thermal mass flow meter; using a thermal mass flow meter allows the flow to be controlled externally and such control interface may be included in the external electronics interface. Optionally, gas delivery system 700 may include multiple pressurized supply tanks, each with a pressure regulator, a gas flow control valve, a gas flow meter, such that the composition of the gas delivered to the electrode-gas delivery fitting can be a predetermined mixture of gases. Alternatively, gas supply vendors can prepare a gas mixture and deliver such mixture in a single tank; although convenient, this approach does not allow for adjustment to be made to the composition during operation, if required. However, if a specific gas mixture is desired for use, this approach allows convenient use of a single tank of gas that may be supplied with proprietary connections allowing a means to ensure proper, company controlled, gases are used with the device.

Plasma generator 500 may optionally include an oscilloscope to monitor the voltage of the control circuitry on the transformer primary wiring and/or on the transformer secondary wiring. If monitoring on the transformer secondary wiring, the oscilloscope must be rated for high voltage or include an optional high voltage probe.

Referring to FIG. 8, in a preferred embodiment, high frequency transformer 530 is a resonating high frequency transformer. A resonating type transformer enables the creation of higher voltages on the secondary winding for a given primary voltage than that possible from a non-resonating transformer of the same turns ratio. A resonating transformer allows simple low-voltage electronics to be used to supply the primary coil on a transformer that has a relatively low turns ratio, yet still achieve voltages sufficient to create plasmas through a single electrode. Further, due to the required frequency range on the order of 100 kHz to create the plasmas herein, traditionally designed and operating transformers may not be feasible because they simply cannot respond to the input frequencies; the transformer core may become saturated and the voltage signal on the secondary winding (532) are not matched to those delivered to the primary windings (531).

One of secondary wiring leads 532 is connected to electrode 540 of plasma head 30 or to electrode 320 of internal injection delivery head 310 and the second of secondary winding leads 532 is left unconnected or connected to termination block 550, or an ungrounded metal body located near plasma head 30 or internal injection delivery head 310.

In a preferred embodiment, a commercial neon-sign power supply is used and comprises transformer 530 as well as the control electronics comprising plasma generator 500. To yield the maximum voltage output, the proper frequency must be obtained for transformer 530 to achieve resonance.

In a preferred embodiment, transformer 530 is an 8-inch long by 1-inch diameter transformer core manufactured by Ceramic Magnetics, Inc. (CMI) of Bethlehem, Pennsylvania. The core is made from CMI's CMD5005 material, which is a high permeability nickel zinc ferrite.

Figure 12:
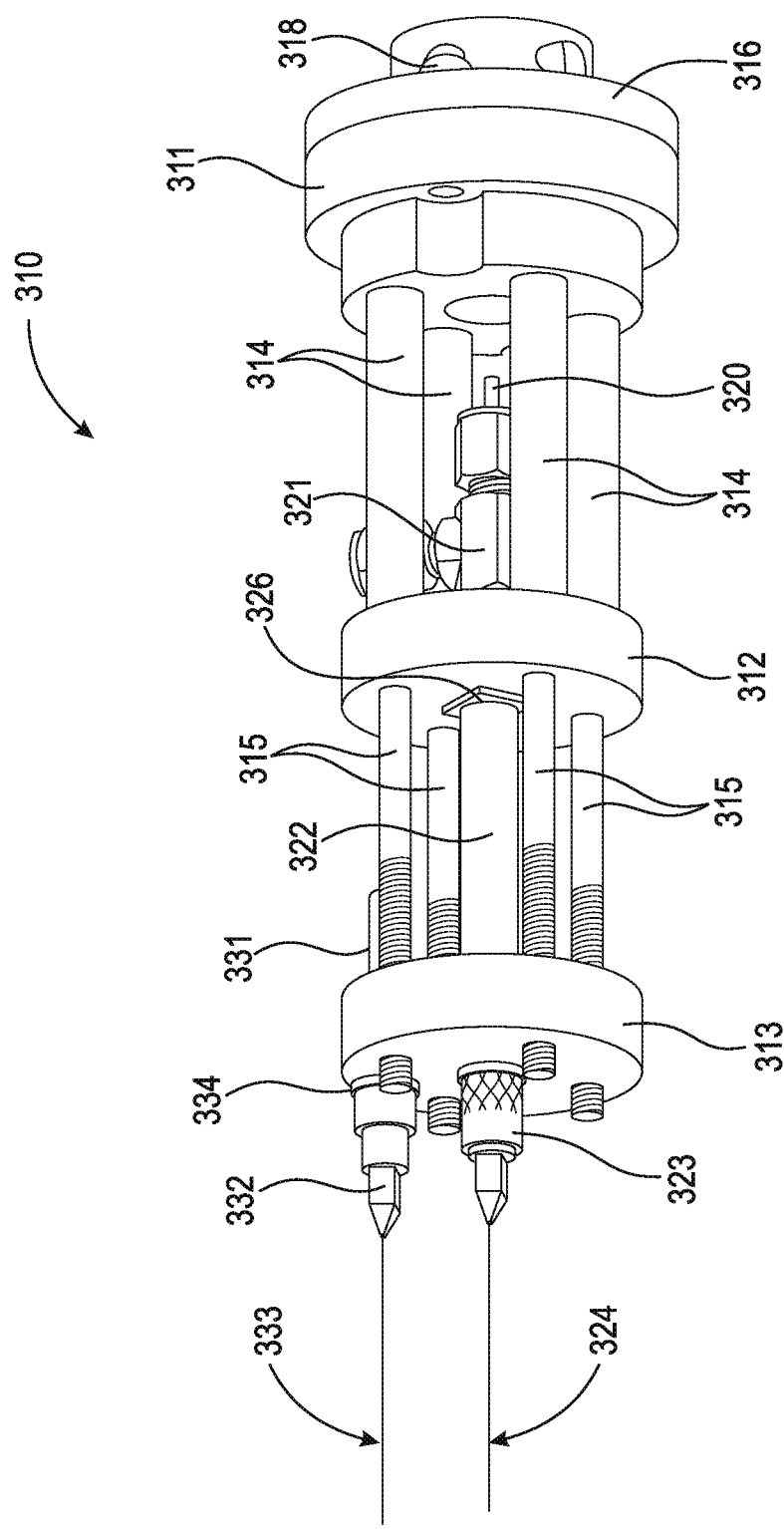
FIG. 12 is a perspective view of the dual-needle robot injector head of the present invention.
Figure 13:
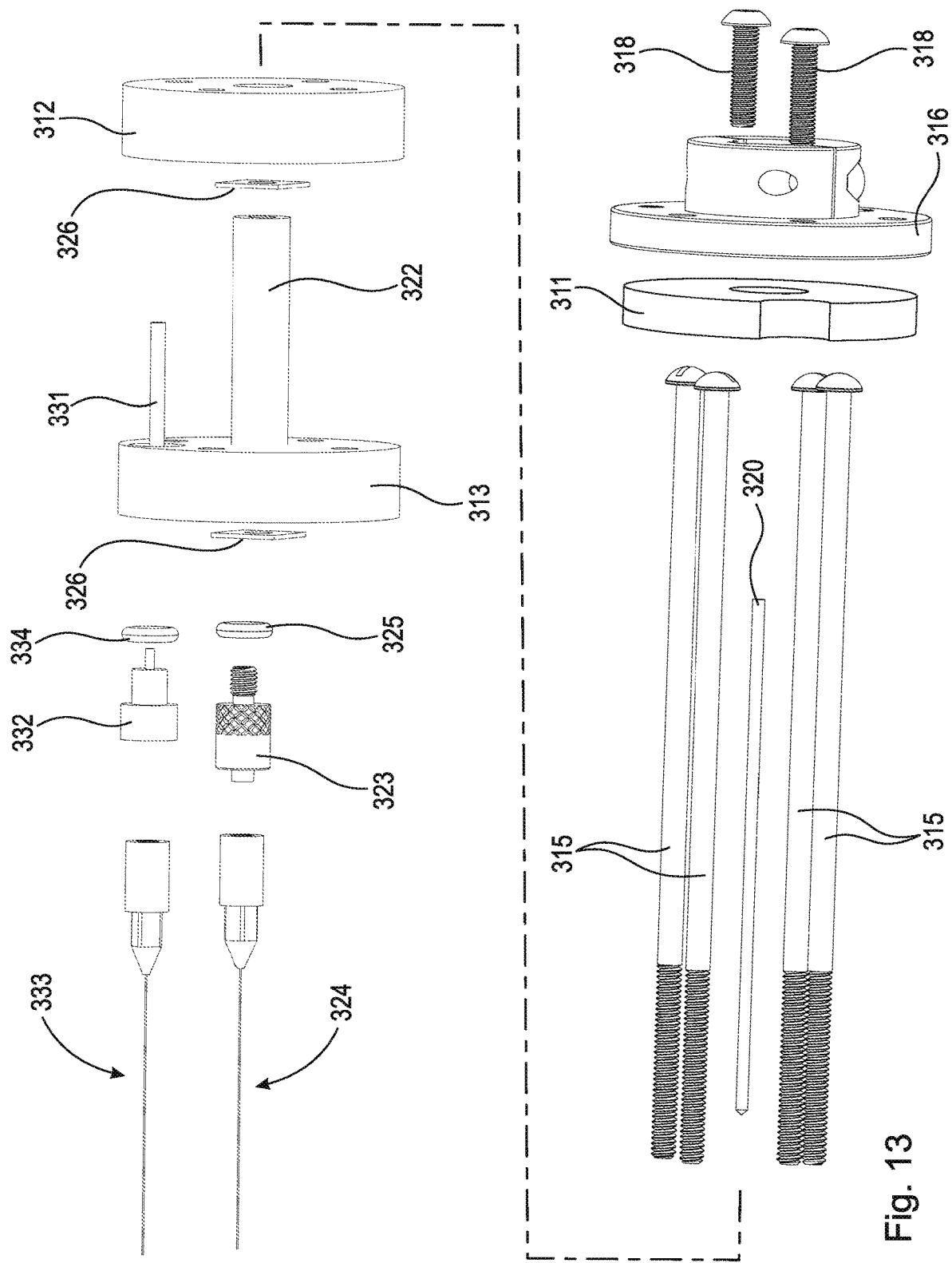
FIG. 13 is an exploded view of the dual-needle robot injector head shown in FIG. 12.

FIG. 12 illustrates internal injection delivery head 310 in a side view in the assembled configuration (FIG. 12) and exploded configuration (FIG. 13). Components that can be seen in these views include flanged shaft collar 316 which serves to connect the head assembly to a robot shaft, not shown, for use in an operational system. Top stabilization disc 311 connects to the flanged shaft collar 316 by means of screws or other means. Four rounded head slotted machine screws 315 are inserted into top stabilization disc 311 and together serve as the primary fixture rail of the overall assembly. Disc spacers 314 fit over each of rounded head slotted machine screw 314 prior to the insertion of the middle stabilization disc 312 to create a space between top stabilization disk 311 and middle stabilization disk 312 to provide room for Yor-Lok fitting 321 which is installed onto middle stabilization disc 312. Tungsten electrode 320 is inserted into a through-port of Yor-Lok Fitting 321 and fixed by means of a sealing cap and a ferrule. A quartz center cylinder 322 is aligned with middle stabilization disc 312 prior to fastening each of rounded head slotted machine screw 315 into bottom stabilization disc 313 such that quartz center cylinder 322 is fixed in place between middle stabilization disc 312 and bottom stabilization disc 313. Gaskets may be used between quartz center cylinder 322 and one or both of the mating stabilizations discs, 312 and/or 313, in order to make or improve the gas-tight seals of the mating surfaces. Plasma injection needle 324 is installed onto the end of bottom stabilization disc 313 by means of adapter fitting 323, which in a preferred embodiment is a Luer lock hose fitting, which mates and seals to bottom stabilization disc 313 by means of an internal mating thread and rubber O-ring 325. With this assembly, plasma gas may be introduced into the side port of the Yor-Lok fitting 321 and forced out through the tip of plasma injection needle 324 without leakage to the outside atmosphere. Drug injection needle 333 is also installed onto the end of bottom stabilization disc 313 by means of adapter fitting 332, which, in a preferred embodiment, is a Quick Turn Tube Coupling, which secures needle 333 to bottom stabilization disc 313 and still allows a drug delivery tube to be connected to the opposing end of adapter 332.

Figure 14A:
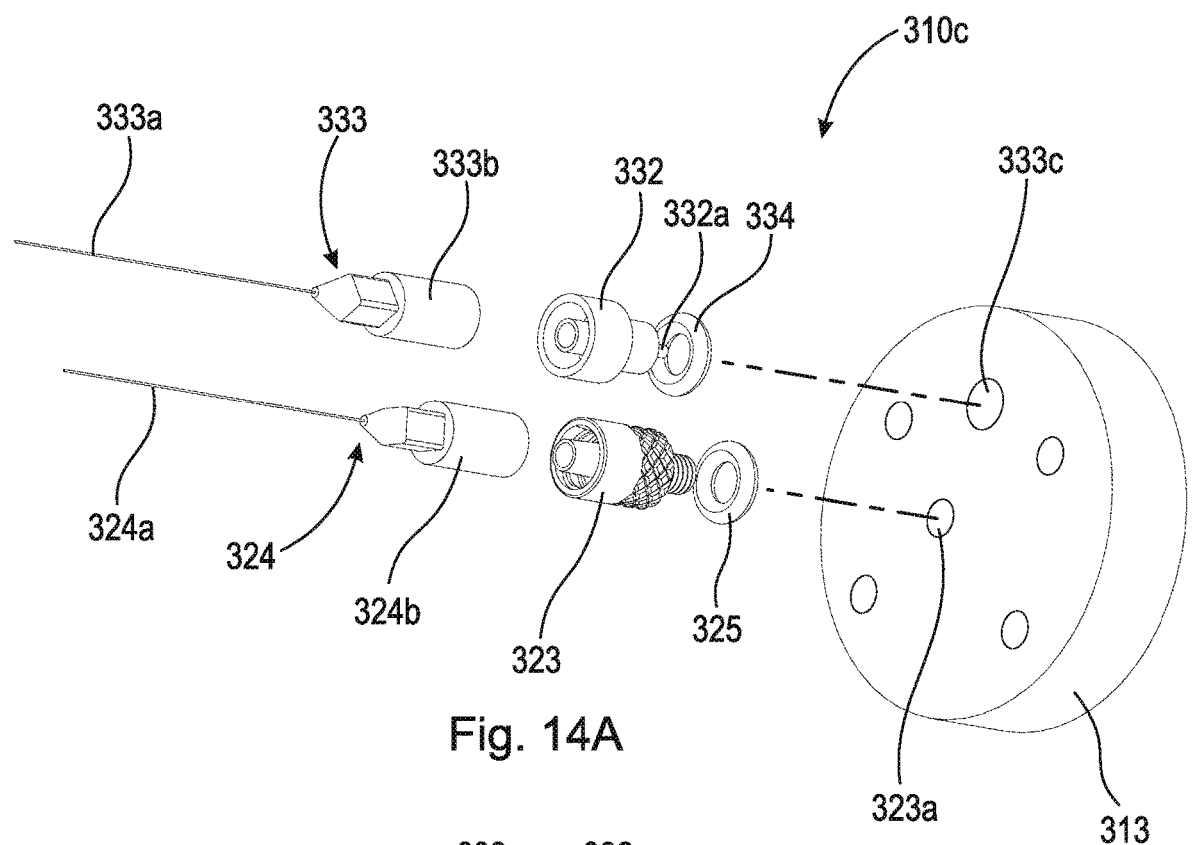
FIG. 14a is an exploded view of the needle section of the dual-needle robot injector head shown in FIG. 12.
Figure 14B:
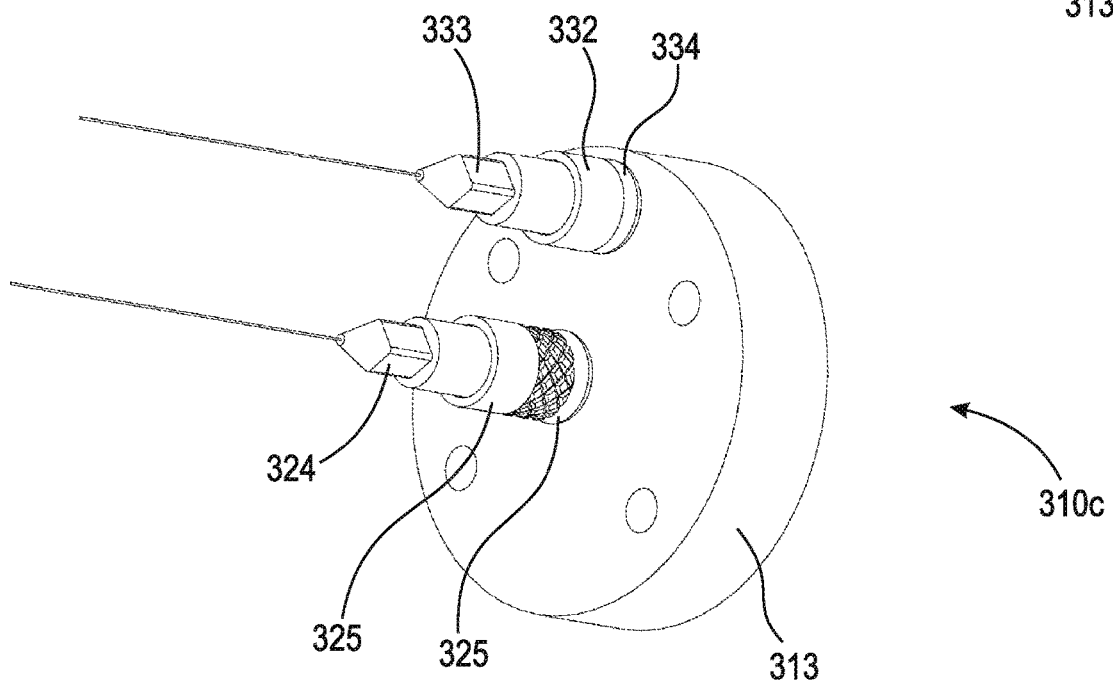
FIG. 14b is a perspective view of the needle section of the dual-needle robot injector head shown in FIG. 12.

Referring now to FIGS. 14A and 14B, the needle section of the dual-needle robot injector head is illustrated in a side perspective view in the exploded configuration (FIG. 14A) and assembled configuration (FIG. 14B). Bottom stabilization disc 313 attaches plasma generating section 310b to needle injection tip section 310c of dual-needle robot injector head 310. There is a 0.1-inch diameter hole cut through the center of bottom stabilization disc 313. On the side of bottom stabilization disc 313 facing quick turn tube coupling 323, the hole is 10-32 threaded and attached to quick turn tube coupling 323. Quick turn tube coupling 323 is a stainless-steel quick turn tube coupling for air. Rubber O-ring 325 is an O-ring located between bottom stabilization disc 313 and quick turn tube coupling 323. Plasma injection needle 324 flat tip 324a (FIG. 14A) in a preferred embodiment is a 2-inch stainless-steel dispensing needle with a 28-gauge blunt flat tip, which is attached by luer lock coupling 324b (FIG. 14A) to quick turn tube coupling 323. Aperture 333c (FIG. 14A) is located on bottom stabilization disc 313, 0.75 in. from the center with a thread of 10-24 in a preferred embodiment. Aperture 333c (FIG. 14A) is used to connect adapter fitting 332 to bottom stabilization disk 313. Adapter fitting 332 is then connected to drug injection needle 333. drug injection needle 333 comprises needle 333a (FIG. 14A) and luer lock house fitting 333b (FIG. 14A) that is arranged to seal into adapter fitting 332. O-ring 334 is located between adapter fitting 332 and bottom stabilization disc 313. Adapter fitting 332 includes Luer lock hose fitting 332a (FIG. 14A) arranged to attach to drug delivery tube 331.

Referring now to FIGS. 15A and 15B, the robot attachment section of the dual-needle robot injector head is illustrated in a side perspective view in the exploded configuration (FIG. 15A) and assembled configuration (FIG. 15B). Top stabilization disc 311 is used to attach robotic attachment section 310a to plasma generating section 310b. Rounded head slotted machine screws 315 are preferably 6-inch long, stainless-steel screws, that run from top stabilization disc 311 through spacers 314 (FIGS. 12 and 13) and through middle stabilization disc 312 until they terminate at bottom stabilization disc 313. Rounded head slotted machine screws 315 are inserted through holes 315a, 315b, 315c, and 315d of top stabilization disc 311, respectively. Flanged shaft collar 316 attaches to top stabilization disc 311 using button head socket cap screws 318 that are preferably placed 180° apart at apertures 318a and 318b and threadably secured to threaded apertures 318c and 318d of top stabilization disc 311.

Figure 16A:
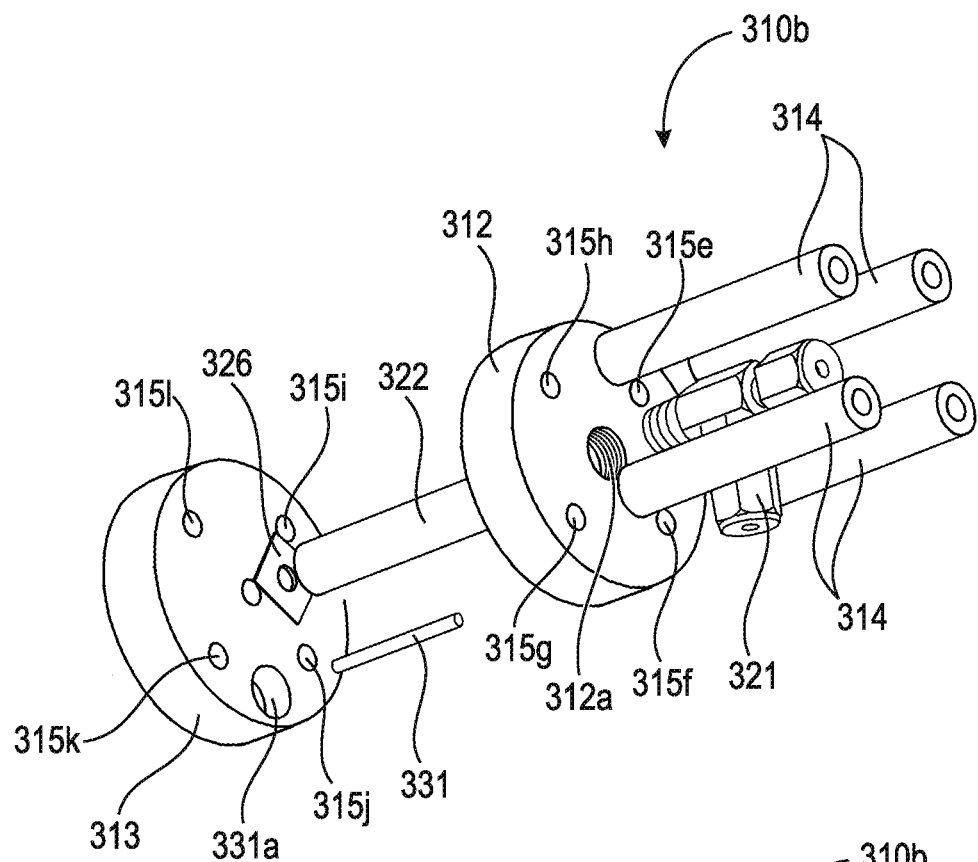
FIG. 16a is an exploded view of the plasma generating section of the dual-needle robot injector head shown in FIG. 12; and, FIG. 16b is a perspective view of plasma generating section of the dual-needle robot injector head shown in FIG. 12.
Figure 16B:
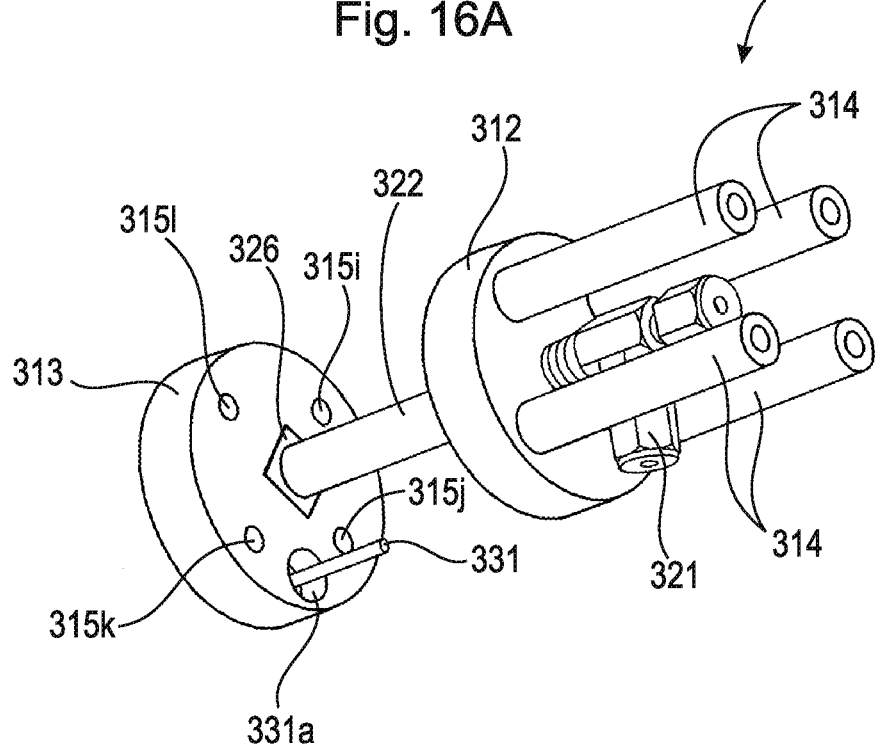

Referring now to FIGS. 16A and 16B, plasma generating section 310b of dual-needle robot injector head 310 is illustrated in a perspective view in the exploded configuration (FIG. 16A) and assembled configuration (FIG. 16B). In the center of section 310b is quartz center cylinder 322, which, in a preferred embodiment, is a quartz cylinder 2-inches in length and having an inner diameter of 0.1-inch and outer diameter of 0.25-inch. Silicon gasket 326, in a preferred embodiment, is a square 0.3 inches in length, high temperature super-soft silicone rubber sheet with 0.1-inch diameter apertures cut out of the center to match the inner diameter of quartz center cylinder 322. Silicon gaskets 326 are located on both ends of quartz center cylinder 322 (also shown in FIG. 12), with the center apertures lined up. Quartz center cylinder 322 is located between middle stabilization disc 312 on its top end and bottom stabilization disc 313 on its bottom end. Middle stabilization disc 312 and bottom stabilization disc 313, in a preferred embodiment are chemical resistant slippery PTFE (Polytetrafluoroethylene) Discs (8596K113) that are ½ inch thick discs with 2 in diameters. Both middle stabilization disc 312 and bottom stabilization disc 313 contain four (4) holes (315e-315l) that are preferably placed 0.7 inches from the center of the disc and spaced 90° apart. Bottom stabilization disc 313 holes 315i, 315j, 315k, 315l are preferably 0.190 inches in diameter and #10-24 threaded. Middle stabilization disc 312 contains four (4) holes 315e, 315f, 315g, 315h, which are non-threaded and preferably 0.190 inches in diameter. Middle stabilization disc aperture 312a is ⅛ NPT threaded, on the side facing 321. Middle stabilization disc 312 is attached to Yor-Lok copper tubing fitting 321 and is preferably configured to accept ⅛th inch tubing (5272k156). Tungsten electrode 320, in a preferred embodiment, is 3-inches in length with a diameter of 1/16th inch. Tungsten electrode 320 feeds through Yor-Lok copper tubing fitting 321 until it is located in the center of the length of quartz center cylinder 322.

The plasma generating electronics in the dual-head design will be the same as described under Plasma Start-Up and Optimization, infra. The plasma is formed in a slightly different mode, however. In this design, the plasma is formed inside of quartz center cylinder 322 and then delivered to the patient through plasma injection needle 324. Operating characteristics of the electronics are similar to what has been provided, except for the gas flow rates. In this embodiment, the gas flow rates will depend in large part on the diameter of plasma injection needle 324, presently in a preferred embodiment, flow rates are 0.1 Liters Per Minute.

The primary operating difference between dual-needle robot injector head 310 and delivery head 210, described supra, is dual-needle robot injector head 310 is intended to be used inside of a cavity, e.g., the cranium, to deliver a drug and plasma separately, opposed to delivery head 210, which delivers a drug and plasma simultaneously. For dual-needle robot injector head 310, operation would use robotic positioning device 200 to position needles 333 and 324 at the desired location within a desired cavity, e.g., the cranium of a patient, at which point a drug would be delivered in the specified dosage over a specified period of time. The delivery of drug to needle 333 would be accomplished in the same way as described supra—a syringe pump or other pump that is electronically connected and controlled by the robotic control system and the drug tubing from the pump connected to the drug needle as described supra.

After the drug has been delivered as specified, robotic positioning device 200 would extract needle 333 from a patient and then adjust the position of dual-needle robot injector head 310 by rotating and/or moving Z-axis shaft 220 such that the tip of plasma injection needle 324 is now positioned for treatment. At this time the plasma would either be continuously running and deliver a treatment by controlling gas flow, power, gas composition, or other properties as specified by the treatment plan. Alternatively, the plasma system can be switched on after the tip of plasma injection needle 324 is in or near the treatment position, or a combination thereof. For example, a continuous low power mode may be running to keep the system in an operating state, and then full power, gas flow, and other characteristics of the plasma are switched on until the treatment is complete.

At this point, after one treatment cycle of drug and plasma has been completed, the robotic system would repeat with another cycle at the next treatment position, which may be some predetermined distance away from the previously completely treatment. For example, a treatment cycle may be desired to be performed every micro-meter, millimeter, centimeter, in distance in the horizontal direction and the same distance or other distance in the vertical direction. Further, various treatment along the depth of the treatment area may be provided as well.

Plasma Start-Up and Optimization

Prior to starting treatment, the plasma system is energized and signal frequency is adjusted until the maximum power is established. First, DC power supply 520 (FIG. 8) is energized and adjusted to the desired output voltage. As described supra, this output voltage is supplied to one lead on primary winding 531 of high frequency transformer 530 and will affect the output voltage of the transformer on secondary winding 532.

In another embodiment, the control circuitry may include an auto-tuning feature that continually adjusts the frequency fed into the electronic amplifier and thus the resulting signal delivered to the primary side of the high frequency transformer. This control technique may use one or more of the following as means to target control of the output frequency: the voltage of the secondary side of the transformer, a signal created by an antenna that is mounted near the high frequency transformer, an optical sensor device that detects the output of light generated by the plasma. Auto-tuning is accomplished through a microprocessor that includes a feature to measure the feedback such as signal strength from an optical detector. The tuning algorithm will adjust the frequency output and then determine if the measured signal strength goes up/down etc.

Robot Operation

The robot is controlled though a predesigned code including a set of variables that can be modified by the operator. These variables make the system easily customizable for the operator by simply changing the numeric values associated with the variable.

The variables that can be changed in this programming include; Speed, Acceleration. Operation Speed, NeedleInj Speed, ApproachContactDepth, InjDepth, XChange, YChange, and InjPoints. The description of each of these variables is as follows:

"Speed" variable can be defined as the baseline running speed of the robot for manual adjustments of the robot while the program is not running.

"Acceleration" variable can be seen as the baseline acceleration of the robot, for manual adjustments of the robot while the program is not running.

"OperationSpeed" Variable is the baseline running speed of the robot, unless specifically defined/adjusted and defines the running speed of the robot while the program is running, defined in mm/s.

"NeedleInj Speed" variable defines the speed at which the needle is injected into the patient in mm/s.

"ApproachContactDepth" Variable defines the maximum distance the robot will travel in downward toward and into the treatment area prior to flipping the skin/surface contact switch (e.g., sensor indication that the needle has reached the treatment surface). This serves as a safety function, and may be tied to an error code "ContactError" to the program thus stopping the program.

"InjDepth" Variable defines the depth the needle will penetrate below the surface/skin after flipping the skin/surface contact switch.

"XChange" Variable defines the distance between injection points along a first axis of the treatment surface, in mm.

"YChange" Variable defines the distance between injection points along a second axis of the treatment surface, in mm.

"InjPoints" Variable is the number of injections desired for the treatment.

Details used for the above example include:
Treatment: skin treatment (size XXX cm by XXX cm)
Target injection depth: XXX mm
Horizontal Spacing between injection sites: XXX mm
Vertical Spacing between injection sites: XXX mm
Injected Drug: Saline
Quantity of drug per injection: 5.8 mL
Total number of injections: XXX
Total quantity of drug injected: XXX mL Note that the term "XXX" in the description above indicates user input variables.

Figure 9:
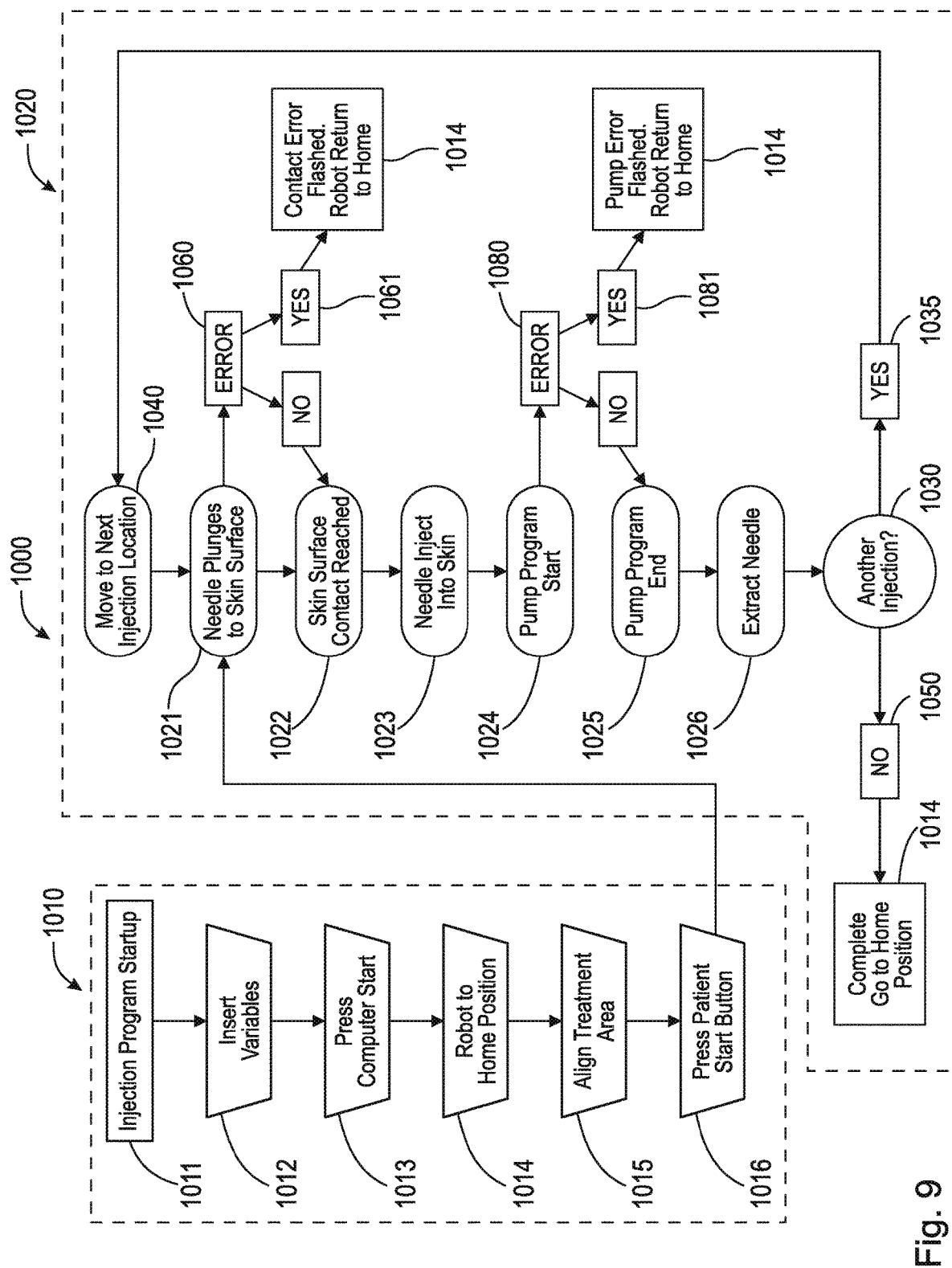
FIG. 9 is a schematic of the robotic positioning device's program operation for positioning the delivery head for injection of a cancer treating drug.

Adverting back to the figures, FIG. 9 illustrates the Program Operation followed by the robot. Program Operation 1000 is defined by Start Sequence 1010 and Treatment Loop 1020. To begin a treatment, an operator first determines the size of the treatment area and inputs for the variables described above. Start Sequence 1010 begins at Injection Program Startup 1011 by the user entering each of the determined variables into the code at Insert Variables 1012. Once completed, the system begins with Press Computer Start 1013 by pressing a predetermined keystroke computer interface/keyboard. Robot to Home Position 1014 will move the robot to the set home point found within the program. Once the robot is in the home position the user will align the treatment area with the robot's starting point laser or other optical sensor at Align Treatment Area 1015. Press Patient Start Button 1016 will execute the program by the operator depressing a start button. The program will begin to execute and the robot then moves the head to each treatment position as defined by the variables described above and executes a set of commands in Treatment Loop 1020.

The follow commands are Treatment Loop 1020. Needle Plunges to Skin Surface 1021 is the first step and plunges the head and needle toward the skin surface; while plunging (Needle Plunges to Skin Surface 1021 is defined herein as the z-axis) a sensor switch is looking for skin contact. The head will continue to descend in the Z direction until a limit switch is activated by Skin Surface Contact Reached 1022 or until the "AproachContactDepth" Variable is met and Contact Error 1060 code is sent (signaling that the predefined safety plunge depth has been reached). If Contact Error 1060 does not make contact with the skin surface, Contact Error Flashed 1061 will return the robot to Robot to Home Position 1014. If the limit switch is tripped at Skin Surface Contact Reached 1022, indicating that the treatment surface has been reached, the subsequent point location is stored in the robotic coordinate system and the program then continues to Needle Inject into Skin 1023 where the delivery head plunges downward to inject the needle. The needle is plunged down to a distance and at a speed determined by the variables "NeedleInjSpeed" and "InjDepth," respectively. After the injection depth has been achieved, Pump Program Start 1024 sends a signal to the pump to begin delivering a predetermined amount of drug. The syringe pump employed here allows the user to define certain drug delivery parameters such as flow rate and total volume of liquid dispensed. If there is an error with the pumping sequence, Pump Error 1080 will stop the program and remove the needle while flashing the error code: "PumpError," and Pump Error Flash 1081 will return the robot to Robot to Home Position 1014. If no error is detected, the pumping program ends (Pump Program End 1025), the needle is removed, (Extract Needle 1026), and the program checks to see if Another Injection 1030 is required. Another Injection 1030 is based on the number associated with the "InjPoints" variable. If another injection is needed, YES 1035 of Another Injection 1030, the head moves to Move to Next Injection Location 1040 and proceeds through Treatment Loop 1020 until the program has been run for the desired amount of injections. Once all of the "InjPoints" variables have been satisfied, NO 1050 of Another Injection 1030 will advance to Complete Go to Home Position 1014 to conclude the desired injection procedure.

External Control Interface

Figure 10:
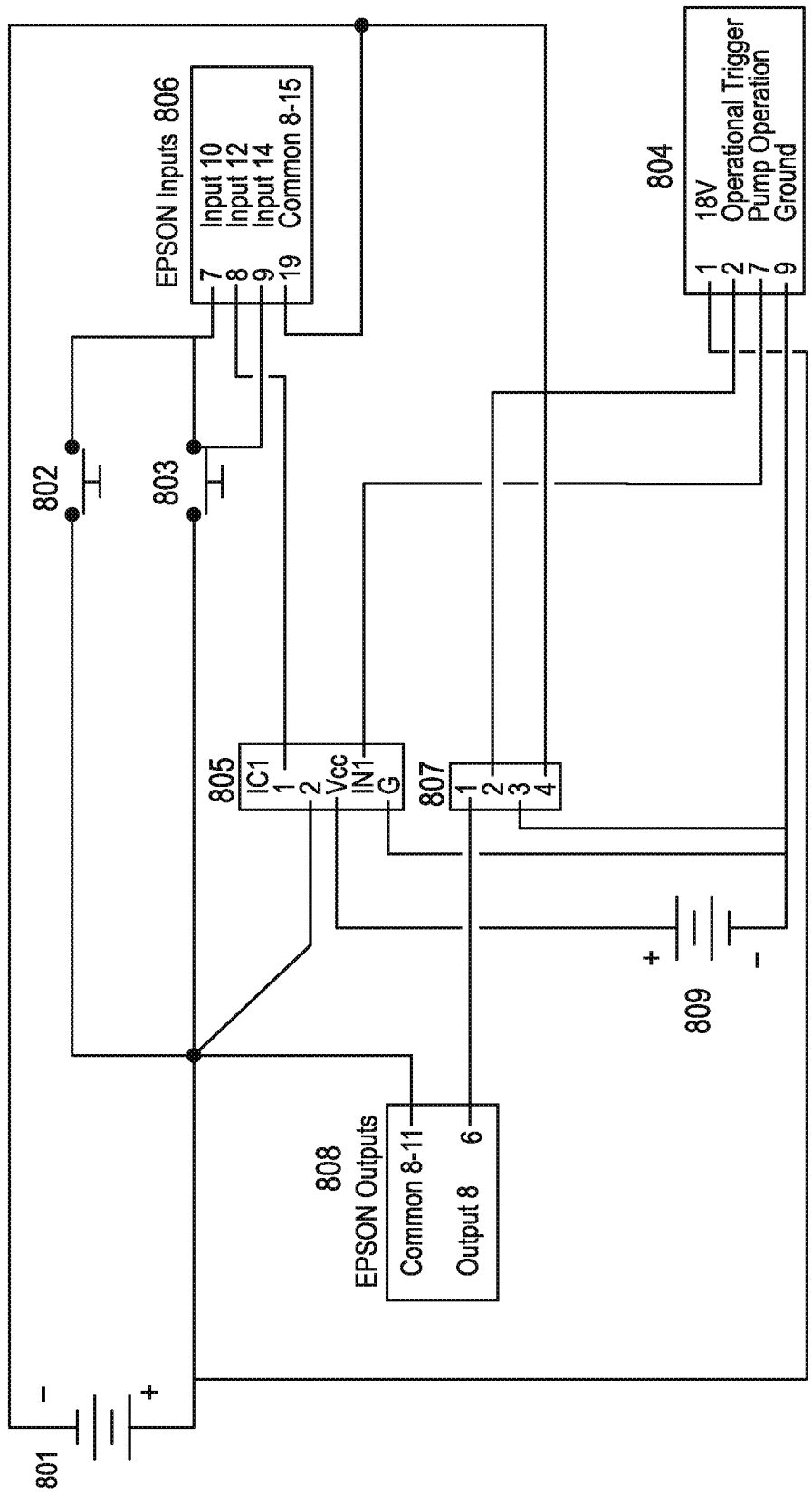
FIG. 10 is schematic circuit diagram of the external electronics interface system.

Referring now to FIG. 10, (External Electronics), a block diagram of electronic components used to support the system operation is shown. The 18V supply 801 provides power to start switch 802, skin contact switch 803, and to pumping system 804. The 5V variable voltage supply delivers power to 5V relay 805 that is used to trigger pump system 804 on and off.

The EPSON Inputs 806 are shown through pins 7, 8, 9, 19 (inputs 10, 12, 14, common 8-15 accordingly). Input 10 is connected to start switch 802. Input 12 is connected to terminal 1 of 5V relay 805 to turn on pump system 804. Input 14 is connected to skin contact limit switch 803 located on the delivery head 120 and 220. Pin 19 is a common terminal for the stated inputs. Pin 19 is connected to the ground of 18V supply 801 as well as to the ground of 12V relay 807.

EPSON Output 808 used in this system is Output 8 (pin 6). This output is connected to Pin 1 of the 12V relay 807 to trigger the pump operation through a computer command. The other output pin used is the common which is tied to the negative terminal of start switch 802 and skin contact limit switch 803 well as terminal 2 of 5V relay 805.

5V relay 805 in use has 5 significant points of connection with the rest of the system. As previously stated, Terminal 1 is connected to EPSON Inputs 806 pin 8 and Pin 2 is connected to EPSON Output 808 common. Pump 804 gets its power through a variable voltage source 5VDC 809. IN1 is connected to the external pumping device pin 7 of pump 804 to control pump operation. The final terminal is a ground that is shared with the 5VDC 809 source as well as the ground of the pumping system pin 9 of pump 804.

12V relay 807 has 4 significant points of connection with the rest of the system. As previously stated, terminal 1 of relay 807 is connected to EPSON Output 808 pin 8 to trigger pumping system 804 with a computer command. Terminal 2 of relay 807 is connected to the operational trigger, pin2, of pumping system 804. Terminal 3 of rely 807 is connected to the shared ground of 5V 809. Terminal 4 of rely 807 is connected to the common of EPSON Inputs 806.

Pumping system 804 has four connection points. The first connection, pin 1 of pumping system 804 is from 18V supply 801. Pins 2 and 7 of pumping system 804 are used as a communication to the computer through a TTL I/O (transistor-transistor logic). Pin 2 of pumping system 804 is used as an operational trigger of a start button for pumping system 804. Pin 7 of pumping system 804 is used to control the pump operation. Pin 9 of pumping system 804 is the ground of pumping system 804 which is shared with the ground of the 18V supply.

Plasma Generation and Delivery of Plasma

Low temperature plasma was generated and delivered to the robot head and directed to flow over the needle at the site of injection. The following equipment, operating conditions, and supplies were used to generate the plasma:

Signal generator: Siglent Model SDG1025 Function Generator

Sine wave+/−10 VDC

Electronic amplifier: IRF540NPBF MOSFET mounted on air cooled heat sink

Temperature maintained below 125 deg. C

DC Power supply: Mastech Model HY3030E DC power supply

DC supply voltage: 12 volts

Gas supply tank: Praxair high-purity helium, 99.999% minimum purity

Transformer core: CMD5005 from Ceramic Magnetics, Inc., size: 8-inch long by 1-inch diameter Wire: Enamel Coated 30 Gauge wire Winding: 5 turns primary/400 turns secondary Diverting back to FIG. 8, to generate plasma, a sine wave signal of 203.4 kHz is delivered to gate 513 of electronic amplifier 515, which is further connected to one of lead on primary side winding 531 of transformer 530. The other lead of the primary side winding 531 is connected to positive lead 522 on the DC power supply 520. A common terminal is created and connected to the second terminal from signal/function generator 560, negative lead 521 of DC power supply 520, and the ground connection of electronic amplifier 515. A high current limit is set on DC power supply 520 to limit this circuity to drive 1.5 amps through primary winding 531 of transformer 530.

Secondary windings 532 on transformer 530 produce approximately 2 kV when measured with a 1 kV oscilloscope probe. This voltage is significantly higher than the voltage expected simply from the multiplication expected by the 5:400 transformer turns ratio. The sine wave signal is adjusted to a resonant frequency that increase the output voltage. One of the leads from secondary winding 532 is connected to electrode 540 of plasma head 30 (describe more below) and the second lead from secondary windings 532 is terminated onto electrically-isolated termination block 550, that is preferably a metal block approximately 30 cm from plasma head 30. Alternatively, one of the leads from secondary winding 532 may be connected to tungsten electrode 320 of internal injection head 310 and the second lead from secondary windings 532 is terminated onto electrically-isolated termination block 550.

High purity helium is supplied by pressurized tank 750 and delivered by gas supply tubing 754 to control valve 752 and then through flow meter 753 (FIG. 11). Control valve 752 is adjusted to deliver approximately 6.5 standard liters of helium per minute (gas a 20 C and 1 atmosphere pressure). This gas is delivered to plasma head 30, which is mounted to delivery head 210 (FIGS. 4A and 4B) fixed to the z-axis shaft 220 of robotic positioning device 100. Alternatively, gas may be delivered to internal injection head 310, through gas supply tubing 754 to Yor-Lok fitting 321 (FIG. 12).

| Reference Numbers | |
|---|---|
| 10 | patient |
| 11 | skin surface |
| 12 | abnormal area |
| 13 | epidermis |
| 14 | dermis |
| 15 | hypodermis |
| 16 | melanoma tumor |
| 21 | shaft collar |
| 22 | needle mount |
| 23 | nylon shoulder screw |
| 24 | two slide guides |
| 25 | base pusher |
| 26 | subminiature snap acting switch |
| 27 | slit in base pusher |
| 28 | switch bracket |
| 30 | plasma head (may also be referred to as a torch head) |
| 31 | plasma head mount |
| 31a | aperture of plasma head mount 31 |
| 31b | aperture of plasma head mount 31 |
| 31c | threaded mounting tube of plasma head 30 |
| 31d | threaded mounting tube of plasma head 30 |
| 40 | needle |
| 41 | turn tube coupling |
| 42 | hose fitting |

-continued

| Reference Numbers | |
|---|---|
| 43 | first through-bore on side of needle mount 21 |
| 44 | second through-bore on side of needle mount 21 |
| 45 | nylon bushings |
| 48 | spring |
| 100 | apparatus for treatment of cancer using combined drug and non-thermal plasma |
| 120 | drug delivery head |
| 130 | motor housing |
| 200 | robotic positioning device |
| 210 | surface drug delivery head |
| 220 | z-axis shaft |
| 300 | robotic controller |
| 310 | internal injection drug delivery head |
| $310_a$ | robotic attachment section |
| $310_b$ | plasma generating section |
| $310_c$ | needle injection tip section |
| 311 | top stabilization disc |
| 312 | middle stabilization disc |
| 312a | middle stabilization disc aperture |
| 313 | bottom stabilization disc |
| 314 | disc spacers |
| 315 | rounded head slotted machine screw |
| 315a | hole for rounded head slotted machine screw 315 |
| 315b | hole for rounded head slotted machine screw 315 |
| 315c | hole for rounded head slotted machine screw 315 |
| 315d | hole for rounded head slotted machine screw 315 |
| 315e | hole for rounded head slotted machine screw 315 |
| 315f | hole for rounded head slotted machine screw 315 |
| 315g | hole for rounded head slotted machine screw 315 |
| 315h | hole for rounded head slotted machine screw 315 |
| 315i | hole for rounded head slotted machine screw 315 |
| 315j | hole for rounded head slotted machine screw 315 |
| 315k | hole for rounded head slotted machine screw 315 |
| 315l | hole for rounded head slotted machine screw 315 |
| 316 | flanged shaft collar |
| 318 | button head socket cap screws |
| 318a | aperture of button head socket cap screw 318 |
| 318b | aperture of button head socket cap screw 318 |
| 318c | threaded aperture of button head socket cap screw 318 |
| 318d | threaded aperture of button head socket cap screw 318 |
| 320 | tungsten electrode |
| 321 | Yor-Lok fitting |
| 322 | quartz center cylinder |
| 323 | quick turn tube coupling |
| 323a | aperture |
| 324 | plasma injection needle |
| $324_a$ | flat tip of plasma injection needle 324 |
| $324_b$ | luer lock coupling of plasma injection needle 324 |
| 325 | rubber O-ring of plasma injection needle 324 |
| 326 | silicon gasket |
| 331 | drug delivery tube |
| 332 | adapter fitting of drug injection needle 333 |
| 332a | luer lock hose fitting |
| 333 | drug injection needle |
| 333a | needle of drug injection needle 333 |
| 333b | luer lock house fitting of drug injection needle 333 |
| 333c | aperture |
| 334 | O-ring of drug injection needle 333 |
| 400 | external electronics interface |
| 401 | plasma head main body |
| 402 | upper electrode coupler |
| 402a | mounting screw aperture |
| 402b | mounting screw aperture |
| 402c | mounting screw aperture |
| 402d | mounting screw aperture |
| 402e | mounting screw aperture |
| 402f | mounting screw aperture |
| 402g | mounting screw aperture |
| 402h | mounting screw aperture |
| 402i | mounting screw aperture |
| 403 | tapered delivery port |
| 404 | wire connector aperture |
| 404a | mounting screw |
| 404b | mounting screw |
| 404c | mounting screw |
| 404d | mounting screw |
| 404e | mounting screw |

-continued

| Reference Numbers | |
|---|---|
| 404f | mounting screw |
| 404g | mounting screw |
| 404h | mounting screw |
| 404i | mounting screw |
| 405 | gas tube connector aperture |
| 405a | through-bore of gas tube connector aperture 405 |
| 406 | BNC (Bayonet Neill-Concelman) connector |
| 408 | gas tubing connector |
| 409 | upper electrode aperture |
| 410 | lower electrode aperture |
| 411 | aperture transition of 409 and 410 |
| 500 | plasma generator |
| 513 | gate of an electronic amplifier |
| 515 | electronic amplifier |
| 520 | DC power supply |
| 530 | kHz frequency transformer |
| 531 | primary winding of kHz frequency transformer |
| 532 | secondary winding of kHz frequency transformer |
| 540 | plasma electrode |
| 541 | tip of plasma electrode |
| 542 | 45° angle of tip 541 |
| 560 | signal generator (also known as a function generator) |
| 600 | syringe pump |
| 601 | drug tubing of syringe pump 600 |
| 700 | gas delivery system |
| 750 | gas supply tank |
| 751 | pressure regulator |
| 752 | gas flow control valve |
| 753 | gas flow meter |
| 754 | gas delivery tubing |
| 801 | 18 VDC supply |
| 802 | start switch |
| 803 | skin contact switch |
| 804 | pumping system |
| 805 | 5 V relay |
| 806 | EPSON inputs |
| 807 | 12 V relay |
| 808 | EPSON outputs |
| 809 | 5 VDC supply |
| 1001 | program operation |
| 1010 | start sequence |
| 1020 | treatment loop |
| 1011 | injection program startup |
| 1012 | insert variables |
| 1013 | press computer start |
| 1014 | robot to home position |
| 1015 | align treatment area |
| 1016 | press patient start button |
| 1020 | treatment loop |
| 1021 | needle plunges to skin surface |
| 1022 | skin surface contact reached |
| 1014 | robot to home position |
| 1023 | needle inject into skin |
| 1024 | pump program start |
| 1025 | pump program end |
| 1026 | extract needle |
| 1030 | another injection |
| 1035 | YES of Another Injection 1030 |
| 1040 | move to next injection location |
| 1050 | NO of Another Injection 1030 |
| 1060 | contact error |
| 1061 | contact error flashed |
| 1080 | pump error |
| 1081 | pump error flash |

COMPUTER PROGRAM LISTING APPENDIX

```
' EPSON RC+ 7.0 Injection Program
' 2/15/19
'
'================================================================================
==================
'
'********************************************************************************
********
'
'********************************************************************************
********
' *********************************                                                    SETUP
'*********************************************
'
'********************************************************************************
********
' ------------------------------------------------------------------------------
' Define Variables & Constants
' ------------------------------------------------------------------------------
#define OperationSpeed 20                                              'Normal Operation Speed mm/s
#define NeedleInjSpeed 1                                               'Needle Injection Speed mm/s
#define ApproachContactDepth 50 'MAX Distance Z traveled until contact error
#define InjDepth 5                                                     'Needle Plunge distance
#define XChange 10                                                     'X dis to next injection site mm
#define YChange -10                                                    'Y dis to next injection site mm
#define InjPoints 3                                            'grid size(if enter 3...3x3 = 6 total injection points)
Integer LoopCount                                                      'integer variable for loop counter
Integer InjCount                                                       'int variable for counting injection locations
Integer XMove                                                          'int variable for X Movement
Integer YMove                                                          'Int variable for Y Movement
'
'********************************************************************************
*****************
' *****************************************                                          PROGRAM
'*********************************************
'
'********************************************************************************
*****************
Function main
    Long cycleCount
    InitRobot
    Do
           Call RunProgram
           'cycleCount = cycleCount + 1
'    Print "Cycle count: ", cycleCount
    Loop
Fend
'================================================================================
==============================================
'==============================                                                      SUBROUTINES
================================================================================
==============================================
Function InitRobot
    Reset
    If Motor = Off Then
           Motor On
    EndIf
    Power High
    Speed 20
    Accel 70, 70
Fend
Function ContactError                                          'function for if skin contact not reached, return home
    If Sw(14) = Off Then
           Print " Error Switch contact Returning to Home"               'flag for if max distance
    reached
           On 0
           Off 6
           Jump inj1
           Quit main
       EndIf
```

-continued

COMPUTER PROGRAM LISTING APPENDIX

```
Fend
Function PumpError
    If Sw(12) = Off Then
        Print " Error Pump Returning to Home"            'flag for if max distance reached
        On 0
        Off 6
        Jump inj1
        Quit main
    EndIf
Fend
Function RunProgram
    Off 0                                                'Light tower off
    Off 2
    Off 4
    Off 6
    On 12                                                'Laser On
    Jump inj1                                            'homepoint set
    Print "Homepoint Set"
    Print "Align Laser with Patient Start Point"
    Print "Press Start Button When Ready"
    Wait Sw(10) = On                                     'Patient Start
    On 6                                                 'LED Blue for running
    Print "Program Started"
    Off 12                                               'Laser Off
    Call fornext
Fend
'========================================================================
    ==============================================
'=================================Injection                               LOOP
    ==============================================================
'========================================================================
    ==============================================
Function fornext
    InjCount = 0                                         'initialize injection point counter
For LoopCount = 1 To InjPoints
    InjCount = InjCount + 1
        XMove = InjCount * XChange
    Go inj1 +X(XMove)
        P2 = Here                                        'New X Set
    Print "Moving towards skin contact"
        Wait 1
        Speed 1                                          'Slower Speed For approach
    Go P2 -Z(ApproachContactDepth) Till Sw(14) = On      'move Z down until touch sensor
high
        Call ContactError 'function for if skin contact not reached, return home
    Print "Skin Contact Reached"
        Wait 1
        P20 = Here                                       'Skin Contact Point Set
        Speed NeedleInjSpeed
        Go P20 -Z(InjDepth)                              'Needle Plunge given distance
        On 2                                             'LED yellow for needle in skin
'Pump Program
        Print "Starting pump program"
        Call PumpProgramX
        Print "Pump program successfully completed, ready to extract needle"
        Print "Remove needle to movement location"
        Wait 1
'Y
        Call YInjection                                  'runs Y direction after X
    Next LoopCount
        Print "Program Complete"
        On 4
        Off 6
                                                         'LED for Complete
Fend
Function PumpProgramX
        On 8                                             'output 8 hI 18 v
        Wait .1
        Off 8                                           'output 8 low
        Wait Sw(12) = Off                                'confirm pump on
        Wait 4
        Call PumpError                                   'Pump Error function
        Wait Sw(12) = On                                'confirm pump off
                                                         'Need electronic
    trigger for when pump finishes
        Wait .1                                          'Delay to allow pump fluid to exit
        Speed OperationSpeed
```

| COMPUTER PROGRAM LISTING APPENDIX |
|---|

```
            Go P2
            Off 2                                                                    'remove needle Inj1
Fend
Function PumpProgramY
            On 8                                                                     'output 8 hI 18 v
            Wait .1
            Off 8                                                                    'output 8 low
            Wait Sw(12) = Off                                                          'confirm pump on
            Wait 4
            Call PumpError                                                             'Pump Error function
            Wait Sw(12) = On                                                           'confirm pump off
                                                                                              'Need
    electronic trigger for when pump finishes
            Wait .1                                                                  'Delay to allow pump fluid to exit
            Speed OperationSpeed
            Go P3                                                                    'remove needle Inj1
            Off 2
Fend
Function YInjection
    Go P2 -Y(YChange)
        P3 = Here                                                                    'New Y value set
            Print "Moving towards skin contact"
            Wait 1
            Speed 1                                                                  'Slower Speed For approach
        Go P3 -Z(ApproachContactDepth) Till Sw(14) = On                              'move Z down until touch sensor
high
            Call ContactError 'function for if skin contact not reached, return home
            Print "Skin Contact Reached"
            Wait 1
            P21 = Here                                                               'Skin Contact Point Set
            Speed NeedleInjSpeed
            Go P21 -Z(InjDepth)                                                      'Needle Plunge given distance
            On 2                                                                     'LED yellow for needle in skin
'Pump Program
            Print "Starting pump program"
            Call PumpProgramY
            Print "Pump program successfully completed, ready to extract needle"
            Print "Remove needle to movement location"
            Wait 1
    Fend
```

What is claimed is:

1. An apparatus for administering a cancer drug, comprising:
    a robotic arm, operatively arranged to move a drug-delivery device, in sequence, to each of a plurality of predetermined positions on tissue to be treated;
    a tactile sensor arranged at the distal end of said drug-delivery device and operatively arranged to determine vertical height movement of said robotic arm for contact with a surface of said tissue to be treated;
    a reservoir arranged to store said cancer drug;
    a needle, operatively arranged to be moved to each of said predetermined positions on said tissue, and to deliver said drug at those positions; and,
    a torch head having an electrode for generating non-thermal plasma in proximity to a distal end of said needle and an area of said tissue to be treated, said torch head having:
    a first end and a second end;
    an upper electrode coupler; and,
    a tube fluidly connected to said torch head at said second end to a gas source, and said first end to discharge non-thermal plasma.

2. The apparatus recited in claim 1 wherein said robotic arm is a robotic positioning device.

3. The apparatus recited in claim 2 wherein said robotic positioning device comprises:
    two, three or more axis positions of control; and,
    a plurality of rotary joints or linear positioning elements.

4. The apparatus recited in claim 2 wherein said robotic positioning device comprises an internal robotic controller.

5. The apparatus recited in claim 1 wherein said drug-delivery device comprises:
    a first end;
    a second end;
    a syringe comprising a first end, a second end, and said reservoir;
    a drug within said reservoir;
    a needle arranged at said first end of said syringe to deliver said cancer drug to said tissue to be treated at said first end of drug-delivery device; and,
    a light sensor operatively arranged to align said drug-delivery device to a starting point of said tissue surface to be treated.

6. The apparatus recited in claim 1 wherein said plasma generation system comprises:
    a high frequency transformer;
    an electronic amplifier;
    a plasma control circuitry wiring;
    a signal generator;
    a control line;
    a primary winding;
    a secondary winding;
    wherein the signal generator is operatively connected to said control line;
    wherein said control line is operatively connected to said electronic amplifier and said signal generator;

wherein said electronic amplifier is operatively connected to said high frequency transformer with said primary winding; and, wherein said electronic amplifier is operatively connected to said control line with said secondary winding and further connected to said electrode.

7. The frequency transformer system recited in claim 6 is electronically connected to the signal generator.

8. The apparatus recited in claim 1 wherein the drug-delivery device comprises:
   an optical emitter operatively arranged to emit a visible point of light onto a tissue surface to be treated to provide visual tracking to said robotic arm, to each of a plurality of predetermined positions onto said tissue to be treated.

9. An apparatus for administering a drug, comprising:
   a robotic arm, operatively arranged to move a drug-delivery device, in sequence, to each of a plurality of predetermined positions on tissue to be treated;
   a reservoir arranged to store said drug;
   a first needle, operatively arranged to be moved to each of said predetermined positions on said tissue, and to deliver said drug at those positions; and,
   a second needle connected to an electrode, in close proximity to said first needle, operatively arranged to be moved to each of said predetermined positions on said tissue, and to deliver an injectable non-thermal plasma at those positions.

10. The apparatus recited in claim 9, further comprising a plasma generation system for generating said non-thermal plasma, comprising:
    a high frequency transformer;
    an electronic amplifier;
    a plasma control circuitry wiring;
    a signal generator;
    a control line;
    a primary winding;
    a secondary winding;
    wherein the signal generator is operatively connected to said control line;
    wherein said control line is operatively connected to said electronic amplifier and said signal generator;
    wherein said electronic amplifier is operatively connected to said high frequency transformer with said primary winding; and,
    wherein said electronic amplifier is operatively connected to said control line with said secondary winding and further connected to said electrode.

11. The apparatus recited in claim 9 wherein said robotic arm is a robotic positioning device.

12. The apparatus recited in claim 11 wherein said robotic positioning device comprises:
    two, three or more axis positions of control; and,
    a plurality of rotary joints or linear positioning elements.

13. The apparatus recited in claim 12 wherein said robotic positioning device comprises an internal robotic controller.

14. The apparatus recited in claim 9 wherein said drug-delivery device comprises:
    a first end;
    a second end;
    a syringe comprising a first end, a second end, and said reservoir;
    a drug within said reservoir;
    a needle arranged at said first end of said syringe to deliver said drug to said tissue to be treated at said first end of drug-delivery device.

15. The apparatus recited in claim 9 wherein said electrode is contained with a tube, said tube is connected to a gas delivery system and to said second needle.

* * * * *